US009473341B2

(12) United States Patent
Zhang et al.

(10) Patent No.: US 9,473,341 B2
(45) Date of Patent: Oct. 18, 2016

(54) SOUNDING AND TONE BLOCK ALLOCATION FOR ORTHOGONAL FREQUENCY MULTIPLE ACCESS (OFDMA) IN WIRELESS LOCAL AREA NETWORKS

(71) Applicant: Marvell World Trade Ltd., St. Michael (BB)

(72) Inventors: Hongyuan Zhang, Fremont, CA (US); Yakun Sun, Sunnyvale, CA (US); Hui-Ling Lou, Sunnyvale, CA (US); Liwen Chu, San Ramon, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 14/555,183

(22) Filed: Nov. 26, 2014

(65) Prior Publication Data
US 2015/0146807 A1   May 28, 2015

Related U.S. Application Data

(60) Provisional application No. 61/938,441, filed on Feb. 11, 2014, provisional application No. 61/909,700, filed on Nov. 27, 2013.

(51) Int. Cl.
*H04L 5/00* (2006.01)
*H04L 27/26* (2006.01)
*H04W 4/08* (2009.01)

(52) U.S. Cl.
CPC .......... *H04L 27/2646* (2013.01); *H04L 5/0007* (2013.01); *H04L 5/0037* (2013.01); *H04L 5/0048* (2013.01); *H04L 5/0053* (2013.01); *H04L 5/0094* (2013.01); *H04W 4/08* (2013.01)

(58) Field of Classification Search
CPC ....... H04B 7/066; H04L 5/00; H04L 5/0001; H04L 5/0003; H04L 5/0005; H04L 5/0007; H04L 5/001; H04L 5/0016; H04L 5/0017; H04L 5/0019; H04L 5/0021; H04L 5/003; H04L 5/0032; H04L 5/0033; H04L 5/0035; H04L 5/0039; H04L 5/0041; H04L 5/0042; H04L 5/0044; H04L 5/006; H04L 5/0062
USPC .......................... 375/259, 260, 267, 295, 299
See application file for complete search history.

(56) References Cited

U.S. PATENT DOCUMENTS 5,933,787 A   8/1999   Gilhousen et al.
6,175,743 B1   1/2001   Alperovich et al.
(Continued)

FOREIGN PATENT DOCUMENTS

EP   907263 A2   4/1999
EP   1168877 A1   1/2002
(Continued)

OTHER PUBLICATIONS

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, pp. 1-512 (1999).
(Continued)

*Primary Examiner* — Siu Lee

(57) ABSTRACT

A first communication device obtains, for each second communication device of a plurality of second communication devices, one or more quality indicators corresponding to one or more sub-channel blocks of an orthogonal frequency division multiplexing (OFDM) communication channel associated with the second communication device. The first communication device selects, based on the quality indicators obtained for each of at least some of the second communication devices, a group of second communication devices for orthogonal frequency division multiple access (OFDMA) communication. The first communication device transmits, to the group of second communication devices, at least one OFDMA data unit that includes respective OFDM data units directed to the two or more second communication devices of the group. The respective OFDM data units are transmitted in respective sub-channel blocks allocated to the two or more second communication devices of the group.

12 Claims, 12 Drawing Sheets

(56) References Cited

U.S. PATENT DOCUMENTS

| | | | |
|---|---|---|---|
| 6,377,813 B1 | 4/2002 | Kansakoski et al. | |
| 6,519,229 B1 | 2/2003 | Arai et al. | |
| 6,947,388 B1 | 9/2005 | Wagner | |
| 6,947,748 B2* | 9/2005 | Li et al. | 455/450 |
| 7,599,332 B2 | 10/2009 | Zelst et al. | |
| 7,742,390 B2 | 6/2010 | Mujtaba | |
| 7,804,800 B2* | 9/2010 | Li et al. | 370/334 |
| 7,917,107 B2 | 3/2011 | Gu et al. | |
| 8,144,647 B2 | 3/2012 | Nabar et al. | |
| 8,149,811 B2 | 4/2012 | Nabar et al. | |
| 8,155,138 B2 | 4/2012 | van Nee | |
| 8,194,604 B2 | 6/2012 | Gault et al. | |
| 8,270,909 B2 | 9/2012 | Zhang et al. | |
| 8,289,869 B2 | 10/2012 | Sawai | |
| 8,363,578 B1 | 1/2013 | Ramamurthy et al. | |
| 8,472,383 B1 | 6/2013 | Banerjea et al. | |
| 8,526,351 B2 | 9/2013 | Fischer et al. | |
| 8,571,010 B1* | 10/2013 | Zhang et al. | 370/351 |
| 8,599,803 B1 | 12/2013 | Zhang et al. | |
| 8,619,907 B2 | 12/2013 | Mujtaba et al. | |
| 8,644,368 B1 | 2/2014 | Zhang et al. | |
| 8,660,497 B1 | 2/2014 | Zhang et al. | |
| 8,670,399 B2 | 3/2014 | Liu et al. | |
| 8,675,575 B2* | 3/2014 | Gong et al. | 370/329 |
| 8,724,546 B2 | 5/2014 | Zhang et al. | |
| 8,724,720 B2 | 5/2014 | Srinivasa et al. | |
| 8,737,405 B2 | 5/2014 | Liu et al. | |
| 8,787,338 B2 | 7/2014 | Liu et al. | |
| 8,787,385 B2 | 7/2014 | Liu et al. | |
| 8,811,203 B1 | 8/2014 | Liu et al. | |
| 8,855,053 B2 | 10/2014 | Chen et al. | |
| 8,886,755 B1 | 11/2014 | Liu et al. | |
| 8,891,640 B2 | 11/2014 | Nabar et al. | |
| 8,923,118 B1 | 12/2014 | Liu et al. | |
| 8,971,350 B1 | 3/2015 | Liu | |
| 8,976,877 B2 | 3/2015 | Stacey et al. | |
| 9,166,660 B2 | 10/2015 | Chu et al. | |
| 2002/0061768 A1 | 5/2002 | Liang et al. | |
| 2002/0098860 A1 | 7/2002 | Pecen et al. | |
| 2002/0145985 A1 | 10/2002 | Love et al. | |
| 2003/0064728 A1 | 4/2003 | Speight | |
| 2003/0128684 A1 | 7/2003 | Hirsch et al. | |
| 2004/0001429 A1 | 1/2004 | Ma et al. | |
| 2004/0057530 A1 | 3/2004 | Tarokh et al. | |
| 2004/0066766 A1 | 4/2004 | Shiu et al. | |
| 2005/0044473 A1 | 2/2005 | Huang et al. | |
| 2005/0058151 A1 | 3/2005 | Yeh | |
| 2005/0135284 A1 | 6/2005 | Nanda et al. | |
| 2005/0135318 A1 | 6/2005 | Walton et al. | |
| 2005/0226198 A1 | 10/2005 | Barak et al. | |
| 2006/0014554 A1 | 1/2006 | Gerlach | |
| 2006/0023669 A1 | 2/2006 | Yamaura et al. | |
| 2006/0045048 A1 | 3/2006 | Kwon et al. | |
| 2006/0120395 A1* | 6/2006 | Xing et al. | 370/431 |
| 2007/0004440 A1 | 1/2007 | Breuer et al. | |
| 2007/0017754 A1 | 1/2007 | Kakinuma et al. | |
| 2007/0060149 A1 | 3/2007 | Lim et al. | |
| 2007/0086370 A1 | 4/2007 | Jang et al. | |
| 2007/0171808 A1 | 7/2007 | Wu et al. | |
| 2007/0206534 A1 | 9/2007 | Kwun et al. | |
| 2007/0223469 A1 | 9/2007 | Chandra et al. | |
| 2007/0237181 A1 | 10/2007 | Cho et al. | |
| 2008/0075058 A1 | 3/2008 | Mundarath et al. | |
| 2008/0084837 A1 | 4/2008 | Watanabe et al. | |
| 2008/0084941 A1 | 4/2008 | Mohanty et al. | |
| 2008/0117867 A1* | 5/2008 | Yin et al. | 370/329 |
| 2008/0119194 A1* | 5/2008 | Kim et al. | 455/442 |
| 2008/0130483 A1 | 6/2008 | Khandekar et al. | |
| 2008/0192644 A1 | 8/2008 | Utsunomiya et al. | |
| 2008/0292015 A1 | 11/2008 | Lee | |
| 2008/0310363 A1 | 12/2008 | McBeath et al. | |
| 2008/0316961 A1 | 12/2008 | Bertrand et al. | |
| 2009/0022093 A1 | 1/2009 | Nabar et al. | |
| 2009/0022128 A1 | 1/2009 | Nabar et al. | |
| 2009/0066577 A1 | 3/2009 | Kim et al. | |
| 2009/0129304 A1 | 5/2009 | Kim et al. | |
| 2009/0196163 A1 | 8/2009 | Du | |
| 2009/0225710 A1 | 9/2009 | Gupta et al. | |
| 2009/0232234 A1 | 9/2009 | Du | |
| 2009/0262696 A1 | 10/2009 | Wei et al. | |
| 2009/0316585 A1 | 12/2009 | Srinivasan et al. | |
| 2010/0029325 A1 | 2/2010 | Wang et al. | |
| 2010/0046358 A1 | 2/2010 | van Nee | |
| 2010/0046656 A1 | 2/2010 | van Nee et al. | |
| 2010/0061333 A1 | 3/2010 | Marsh et al. | |
| 2010/0061334 A1 | 3/2010 | Gault et al. | |
| 2010/0067589 A1 | 3/2010 | Schumacher et al. | |
| 2010/0091675 A1 | 4/2010 | Sawai | |
| 2010/0118829 A1 | 5/2010 | Lin et al. | |
| 2010/0165959 A1 | 7/2010 | Park et al. | |
| 2010/0220601 A1 | 9/2010 | Vermani et al. | |
| 2010/0246498 A1 | 9/2010 | Lim et al. | |
| 2010/0250159 A1 | 9/2010 | Hall | |
| 2010/0309834 A1 | 12/2010 | Fischer et al. | |
| 2010/0309868 A1 | 12/2010 | Yang et al. | |
| 2011/0002219 A1 | 1/2011 | Kim et al. | |
| 2011/0038332 A1 | 2/2011 | Liu et al. | |
| 2011/0053527 A1 | 3/2011 | Hunzinger | |
| 2011/0096796 A1 | 4/2011 | Zhang et al. | |
| 2011/0096797 A1 | 4/2011 | Zhang et al. | |
| 2011/0116485 A1 | 5/2011 | Olszewski et al. | |
| 2011/0128929 A1 | 6/2011 | Liu et al. | |
| 2011/0128947 A1 | 6/2011 | Liu et al. | |
| 2011/0194644 A1 | 8/2011 | Liu et al. | |
| 2011/0235596 A1 | 9/2011 | Wentink | |
| 2011/0310827 A1 | 12/2011 | Srinivasa et al. | |
| 2012/0033753 A1* | 2/2012 | Hamaguchi | 375/260 |
| 2012/0039196 A1 | 2/2012 | Zhang | |
| 2012/0044906 A1 | 2/2012 | Chen et al. | |
| 2012/0082040 A1 | 4/2012 | Gong et al. | |
| 2012/0275409 A1* | 11/2012 | Han et al. | 370/329 |
| 2013/0259017 A1 | 10/2013 | Zhang et al. | |
| 2013/0286959 A1* | 10/2013 | Lou et al. | 370/329 |
| 2013/0301551 A1 | 11/2013 | Ghosh et al. | |
| 2015/0049727 A1 | 2/2015 | Wentink et al. | |
| 2015/0063255 A1 | 3/2015 | Tandra et al. | |
| 2015/0117227 A1 | 4/2015 | Zhang et al. | |
| 2015/0146653 A1 | 5/2015 | Zhang et al. | |
| 2015/0146654 A1 | 5/2015 | Chu et al. | |
| 2015/0146807 A1 | 5/2015 | Zhang et al. | |
| 2015/0146808 A1 | 5/2015 | Chu et al. | |
| 2015/0146812 A1 | 5/2015 | Chu et al. | |

FOREIGN PATENT DOCUMENTS

| | | |
|---|---|---|
| JP | 10136446 | 5/1998 |
| JP | 11069426 | 3/1999 |
| WO | WO-2008/025040 A2 | 2/2008 |
| WO | WO-2011/035204 A2 | 3/2011 |
| WO | WO-2012/051319 A1 | 4/2012 |
| WO | WO-2012/111939 A2 | 8/2012 |
| WO | WO-2012/173326 A1 | 12/2012 |

OTHER PUBLICATIONS

IEEE Std P802.11-REVma/06.0, (Revision of IEEE Std 802.11-1999) "Unapproved Draft Standard for Information Technology—Telecommunications and information exchange between systems—Local and metropolitan area network—Specific requirements Part 11: Wireless LAN Medium Access Control (MAC) and Physical Layer (PHY) specifications," (This document reflects the combining of the 2003 Edition of 802.11 plus the 802.11 g, 802.11 h, 802.11 i and 802.11j Amendments) (Superseded by P802.11-REVma_D7.0), pp. 1-1212 (2006).

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, pp. 1-1184 (Jun. 12, 2007).

(56) References Cited

OTHER PUBLICATIONS

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHz Band," *The Institute of Electrical and Electronics Engineers, Inc.*, pp. 1-83 (Sep. 1999).

IEEE Std 802.11a-1999 (R2003) (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHz Band," *The Institute of Electrical and Electronics Engineers, Inc.*, pp. 1-92, (1999) Reaffirmed (Jun. 12, 2003).

IEEE Std 802.11b-1999 (Supplement to ANSI/IEEE Std 802.11, 1999 Edition) "Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications: Higher-speed Physical Layer Extension in the 2.4 GHz Band," *The Institute of Electrical and Electronics Engineers, Inc.*, pp. 1-89 (Sep. 1999).

IEEE Std 802.11b-1999/Cor Jan. 2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, pp. 1-23 (Nov. 7, 2001).

IEEE Std 802.11g/D2.8, May 2002 (Supplement to ANSI/IEEE Std 802.11, 1999 Edition) "Draft Supplement to Standard [for] Information technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band,"*The Institute of Electrical and Electronics Engineers, Inc.*, pp. 1-53 (May 2002).

IEEE Std 802.11g/D8.2, Apr 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band,"*The Institute of Electrical and Electronics Engineers, Inc.*, pp. 1-69 (Apr. 2003).

IEEE P802.11 n™ D3.00, "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, pp. 1-544 (Sep. 2007).

IEEE Std. 802.11 n™ "IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, pp. 1-535 (Oct. 2009).

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, *The Institute of Electrical and Electronics Engineers, Inc.*, pp. 1-2695 (Mar. 29, 2012).

IEEE Std 802.11ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-359 (Jan. 2012).

IEEE Std 802.11ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-363 (Mar. 2012).

IEEE Std 802.11ac/D3.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-385 (Jun. 2012).

IEEE Std 802.11ac/D4.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-408 (Oct. 2012).

IEEE Std 802.11ac/D5.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-440 (Jan. 2013).

IEEE Std 802.11ac/D6.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-446 (Jul. 2013).

IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

IEEE Std 802.11ah™/D1.0 "Draft Standard for Information Technology—Telecommunications and information exchange between systems Local and metropolitan area networks—Specific requirements, Part 11: Wireless LAN Medium Access Control (MAC) and Physical Layer (PHY) specifications: Amendment 6: Sub 1 GHz License Exempt Operation," *The Institute of Electrical and Electronics Engineers, Inc.*, pp. 1-394 (Oct. 2013).

Cariou et al., "Multi-channel Transmissions," Doc. No. IEEE 802.11-09/1022r0, *The Institute of Electrical and Electronics Engineers, Inc.*, pp. 1-13 (Sep. 2009).

Chen, "Home Network Basis: Transmission Environments and Wired/Wireless Protocols," *Prentice Hall*, pp. 1-26 (Jul. 2003).

Hiertz, et al., "The IEEE 802.11 Universe," *IEEE Communications Magazine*, pp. 62-70, (Jan. 2010).

(56) References Cited

OTHER PUBLICATIONS

Liu, et al., "VHT BSS Channel Selection," *Institute of Electrical and Electronics Engineers, Inc.*, doc. No. IEEE 802.11-11/1433r0, pp. 1-10 (Nov. 2011).

Mujtaba, S.A. "IEEE P802.11—Wireless LANs, TGn Sync Proposal Technical Specification," *The Institute of Electrical and Electronics Engineers, Inc.*, doc.: IEEE 802.11—04/0889r6, pp. 1-131 (May 2005).

Noh, et al., "Channel Selection and Management for 11ac," Doc. No. IEEE 802.11-10/0593r1, *The Institute of Electrical and Electronics Engineers, Inc.*, pp. 1-21 (May 20, 2010).

Park, "IEEE 802.11ac: Dynamic Bandwidth Channel Access," 2011 IEEE Int'l Conf. on Communications (ICC), pp. 1-5 (Jun. 2011).

Pedersen et al., "Carrier Aggregation for LTE-Advanced: Functionality and Performance Aspects," IEEE Communications Magazine, vol. 49, No. 6, pp. 89-95, (Jun. 1, 2011).

Perahia, et al., "Gigabit Wireless LANs: an overview of IEEE 802.11ac and 80211ad," ACM SIGMOBILE Mobile Computing and Communications Review, vo. 15, No. 3, pp. 23-33 (Jul. 2011).

Redieteab, et al., "Cross-Layer Multichannel Aggregation for Future WLAN Systems," 2010 IEEE Int'l Conf. on Communication Systems (ICCS), pp. 740-756 (Nov. 2010).

Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).

Stacey et al., "Specification Framework for TGac," document No. IEEE 802.11-09/0992r20, *Institute for Electrical and Electronics Engineers*, pp. 1-49, (Jan. 18, 2011).

van Nee, et al. "The 802.11n MIMO-OFDM Standard for Wireless LAN and Beyond," Wireless Personal Communications, vol. 37, pp. 445-453 (Jun. 2006).

Wannstrom, "Carrier Aggregation explained," pp. 1-6 (May 2012).

Yuan et al., "Carrier Aggregation for LTE-Advanced Mobile Communication Systems," *IEEE Communications Magazine*, pp. 88-93 (Feb. 2010).

Chu, et al., "Uplink Multi-User Multiple Input Multiple Output Beamforming," U.S. Appl. No. 14/554,497, filed Nov. 26, 2014 (60 pages).

Chu, et al., "Uplink Multi-User Multiple Input Multiple Output for Wireless Local Area Network," U.S. Appl. No. 14/553,982, filed Nov. 25, 2014 (47 pages).

Chu, et al., "Medium Access Protection and Bandwidth Negotiation in a Wireless Local Area Network," U.S. Appl. No. 14/555,305, filed Nov. 26, 2014 (74 pages).

Liu, et al, "Methods and Apparatus for Clear Channel Assessment," U.S. Appl. No. 13/034,421, filed Feb. 24, 2011 (47 pages).

Liu, et al, "Accessing Channels in a Multi-Channel Communication System," U.S. Appl. No. 13/440,214, filed Apr. 5, 2012 (38 pages).

Zhang, et al, "OFDMA with Block Tone Assignment for WLAN," U.S. Appl. No. 12/730,651, filed Mar. 24, 2010 (39 pages).

Zhang, et al., Orthogonal Frequency Division Multiple Access for Wireless Local Area Network, U.S. Appl. No. 14/553,974, filed Nov. 25, 2014 (88 pages).

International Search Report and Written Opinion in International Application No. PCT/US2014/067728, mailed Mar. 17, 2015 (12 pages).

3GPP TS 36.213, V8.5.0, "3rd Generation Partnership Project; Technical Specification Group Radio Access Network; Evolved Universal Terrestrial Radio Access (E-UTRA); Physical layer procedures (Release 8)," *3rd Generation Partnership Project*, 76 pages (Dec. 2008).

Eslami, et al., "Net Throughput Maximization of Per-Chunk User Scheduling for MIMO-OFDM Downlink," *IEEE Transactions on Vehicular Technology*, vol. 60, No. 9, pp. 4338-4348 (Nov. 2011).

Jang, et al., "Frame Design and Throughput Evaluation for Practice Multiuser MIMO OFDMA Systems," *IEEE Transactions on Vehicular Technology*, vol. 60, No. 7, pp. 3127-3141 (Sep. 2011).

Liu, et al., "Downlink MIMO in LTE-Advanced: SU-MIMO vs. MU-MIMO," LTE Advance and 4G Wireless Communications, *IEEE Communications Magazine*, pp. 140-147 (Feb. 2012).

Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).

IEEE Std 802.11e/D11.0, "IEEE Standard for Information technology—Telecommunications and information exchange between systems—Local and metropolitan area networks—Specific requirements, Part 11: Wireless Medium Access Control (MAC) and Physical Layer (PHY) Specifications: Amendment 7: Medium Access Control (MAC) Quality of Service (QoS) Enhancements, " *The Institute of Electrical and Electronics Engineers, Inc.*, pp. 1-196 (Oct. 2004).

IEEE Std 802.16/2004 (Revision of IEEE Std 802.16/2001), "IEEE Standard for Local and metropolitan area networks; Part 16: Air Interface for Fixed Broadband Wireless Access Systems," *The Institute of Electrical and Electronics Engineers, Inc.*, 893 pages (Oct. 1, 2004).

IEEE P802.16Rev2/D5 (Jul. 2008) (Revision of IEEE Std 802.16-2004 and consolidates material from IEEE Std 802.16e-2005, Std 802.16-2004/Cor1-2005, Std 802.16f-2005 and Std 802.16g-2007) "Draft Standard for Local and metropolitan area networks: Part 16: Air Interface for Broadband Wireless Access Systems," *The Institute of Electrical and Electronics Engineers, Inc.*, pp. 1-1970 (Jun. 2008).

Zhang et al., "Uplink Multiuser MIMO in WLAN," U.S. Appl. No. 61/227,356, filed Jul. 21, 2009 (36 pages).

IEEE Std 802.16-2009 (Revision of IEEE Std. 802.16-2004), IEEE Standard for Local and metropolitan area networks: Part 16: Air Interface for Broadband Wireless Access Systems, *The Institute of Electrical and Electronics Engineers, Inc.*, 2082 pages (May 29, 2009).

IEEE Std 802.16e-2005 and IEEE Std 802.16-2004/Cor1-2005 (Amendment and Corrigendum to IEEE Std 802.16-2004), IEEE Standard for Local and metropolitan area networks: Part 16: Air Interface for Fixed and Mobile Broadband Wireless Access Systems: Amendment 2: Physical and Medium Access Control Layers for Combined Fixed and Mobile Operation in Licensed Bands and Corrigendum 1, *The Institute of Electrical and Electronics Engineers, Inc.*, pp. 1-864 (Feb. 28, 2006).

IEEE 802.20-PD-06; IEEE P 802.20TMV14, Draft 802.20 Permanent Document; <System Requirements for IEEE 802.20 Mobile Broadband Wireless Access Systems—Version 14>, 24 pages (Jul. 16, 2004).

Ansari et al., "Unified MIMO Pre-Coding Based on Givens Rotation," *The Institute of Electrical and Electronics Engineers*, doc. No. IEEE C802.16e-04/516r2, pp. 1-13, (Jan. 11, 2005).

Imashioya et al., "RTL Design of 1.2 Gbps MIMO WLAN System and Its Business Aspect," IEEE 9th Int'l Symposium on Communications and Information Technology (ISCIT 2009), *The Institute of Electrical and Electronics Engineers*, pp. 296-301 (2009).

Lestable et al., "Uplink MIMO Schemes for 802.16m," IEEE 802.16 Broadband Wireless Access Working Group, IEEE C802.16m-08/534, 18 pages (Jul. 7, 2008).

Love et al., "An Overview of Limited Feedback in Wireless Communication Systems," IEEE J. on Selected Areas in Communications, vo. 26, No. 8, pp. 1341-1365 (Oct. 2008).

Syafei et al., "A Design of Next Generation Gigabit MIMO Wireless LAN System ," IEEE 12th Int'l Conference on Advanced Communication Technology (ICACT 2010), *The Institute of Electrical and Electronics Engineers*, pp. 941-946 (2010).

Syafei et al., "A Gigabit MIMO WLAN System with International Standardization Strategy," IEEE Int'l Symposium on Intelligent Signal Processing and Communication Systems (ISPACS 2009), *The Institute of Electrical and Electronics Engineers*, pp. 228-231 (2009).

Syafei et al., "Design of 1.2 Gbps MIMO WLAN System for 4K Digital Cinema Transmission," IEEE 20th Int'l Symposium on Personal, Indoor and Mobile Radio Communications (PIMRC 2009), *The Institute of Electrical and Electronics Engineers*, pp. 207-211 (2009).

Tandai et al., "An efficient uplink multiuser MIMO protocol in IEEE 802.11 WLANs," IEEE 20th Int'l Symposium on Personal, Indoor

(56) References Cited

OTHER PUBLICATIONS and Mobile Radio Communications (PIMRC 2009), *The Institute for Electrical and Electronics Engineers*, pp. 1153-1157 (Sep. 13, 2009).

Zhang et al., "Applying Antenna Selection in WLANs for Achieving Broadband Multimedia Communications," *IEEE Trans. on Broadcasting*, vol. 52, No. 4, pp. 475-482 (Dec. 2006).

U.S. Appl. No. 14/755,722, filed Jun. 30, 2015.

Ex parte Quayle Office Action of U.S. Appl. No. 14/554,497, mailed Mar. 27, 2015 (14 pages).

Ex parte Quayle Office Action of U.S. Appl. No. 14/755,722, mailed Oct. 7, 2015 (19 pages).

IEEE Std 802.16TM-2012 (Revision of IEEE Std. 802.16-2009), IEEE Standard for Air Interface for Broadband Wireless Access Systems: Part 1—Beginning through Section 7, IEEE Computer Society and the IEEE Microwave Theory and Techniques Society, *The Institute of Electrical and Electronics Engineers, Inc.*, 2558 pages (Aug. 17, 2012).

Zhang, et al., "Sounding and Tone Block Allocation for Orthogonal Frequency Multiple Access (OFDMA) in Wireless Local Area Networks," U.S. Appl. No. 14/555,183, filed Nov. 26, 2014 (57 pages).

Invitation to Pay Additional Fees and Partial International Search Report for International Application No. PCT/US2014/067583, mailed Mar. 6, 2015 (8 pages).

International Search Report and Written Opinion in International Application No. PCT/US2014/067596, mailed Feb. 20, 2015 (12 pages).

Bejerano, "IEEE 802.11 ac: from channelization to multi-user MIMO," IEEE Communications Magazine, IEEE Service Center, vol. 51 No. 10, pp. 84-90 (Oct. 1, 2013).

Kumaradan, "Uplink Scheduling in CDMA Packet-Data Systems," Journal Wireless Networks, vol. 12, Issue 1, pp. 33-43 (Feb. 2006).

International Preliminary Report on Patentability in International Application No. PCT/US2014/067728, mailed Jun. 9, 2016 (9 pages).

\* cited by examiner

FIG. 2C

| 20 MHZ FOR STA 1 | 40 MHZ FOR STA 2 | 20 MHZ FOR STA 3 |

FIG. 2D

| 20 MHZ FOR STA 1 | 40 MHZ FOR STA 2 | 10 MHZ FOR STA 3 | 10 MHZ FOR STA 3 |

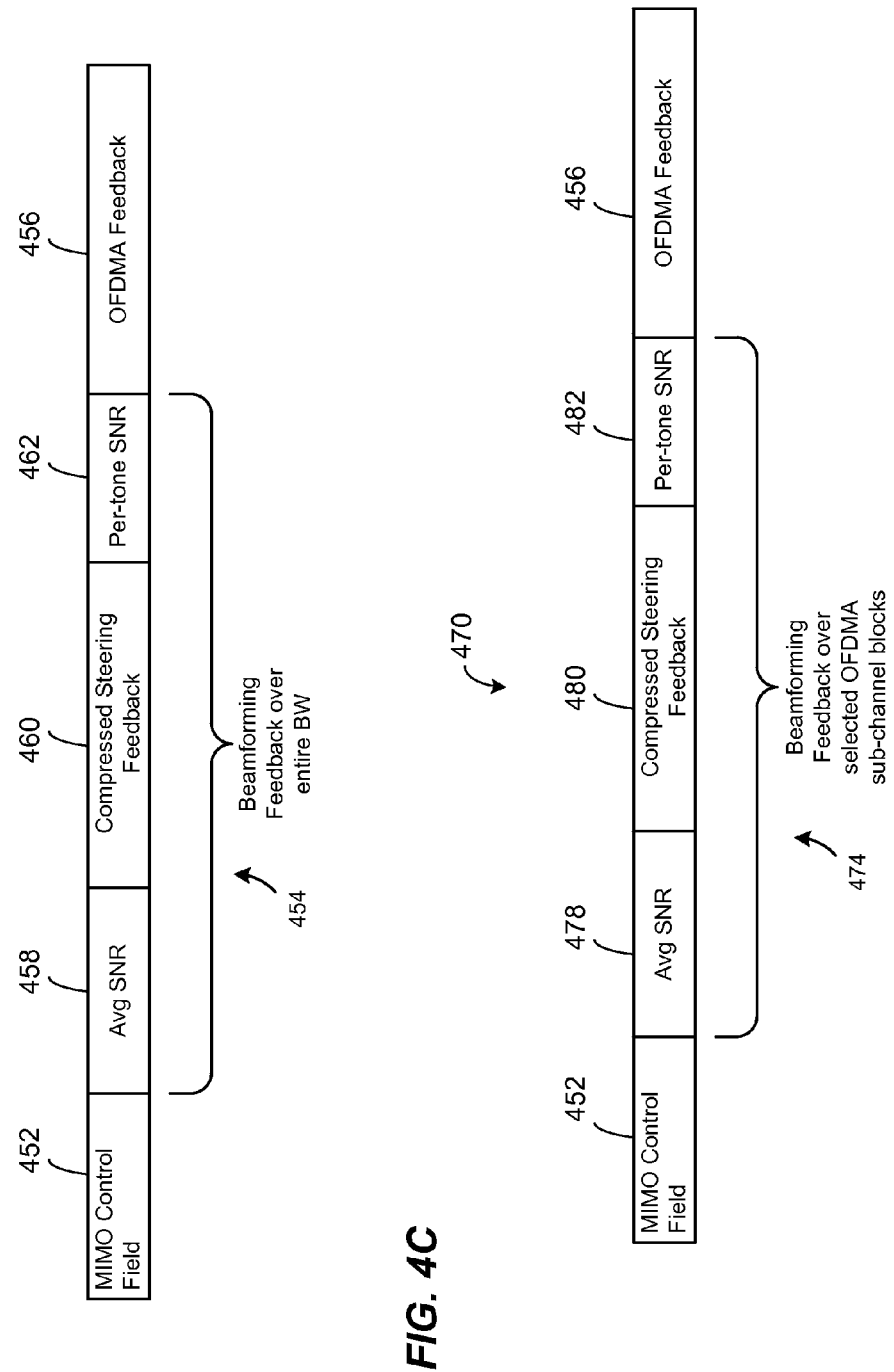

SOUNDING AND TONE BLOCK ALLOCATION FOR ORTHOGONAL FREQUENCY MULTIPLE ACCESS (OFDMA) IN WIRELESS LOCAL AREA NETWORKS

CROSS-REFERENCE TO RELATED APPLICATION

This disclosure claims the benefit of U.S. Provisional Patent Application Nos. 61/909,700, filed Nov. 27, 2013, and 61/938,441, filed Feb. 11, 2014, both entitled "OFDMA for WLAN: Sounding and Tone-Block Allocation," the disclosures of which are hereby expressly incorporated herein by reference in their entireties.

FIELD OF THE DISCLOSURE

The present disclosure relates generally to communication networks and, more particularly, to wireless local area networks that utilize orthogonal frequency division multiplexing (OFDM).

BACKGROUND

When operating in an infrastructure mode, wireless local area networks (WLANs) typically include an access point (AP) and one or more client stations. WLANs have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughputs, such as throughputs in the tens of Gbps range.

SUMMARY

In an embodiment, a method for simultaneously communicating with multiple communication devices in a communication network includes obtaining, at a first communication device for each second communication device of a plurality of second communication devices, one or more quality indicators corresponding to one or more sub-channel blocks of an orthogonal frequency division multiplexing (OFDM) communication channel associated with the second communication device. The method also includes selecting, at the first communication device based on the quality indicators obtained for each of at least some of the second communication devices, a group of second communication devices for orthogonal frequency division multiple access (OFDMA) communication, wherein the group includes two or more second communication devices of the plurality of second communication devices. The method additionally includes transmitting, from the first communication device to the group of second communication devices, at least one OFDMA data unit that includes respective OFDM data units directed to the two or more second communication devices of the group, wherein the respective OFDM data units are transmitted in respective sub-channel blocks allocated to the two or more second communication devices of the group.

In another embodiment, an apparatus for use in a communication system comprises a network interface configured to obtain, for each of a plurality of communication devices, one or more quality indicators corresponding to one or more sub-channel blocks of an orthogonal frequency division multiplexing (OFDM) communication channel associated with the communication device. The network interface is further configured to select, based on the quality indicators obtained for each of at least some communication devices of the plurality of communication devices, a group of communication devices for orthogonal frequency division multiple access (OFDMA) communication, wherein the group includes two or more communication devices of the plurality of communication devices. The network interface is additionally configured to transmit, to the group of communication devices, at least one OFDMA data unit that includes respective OFDM data units directed to the two or more communication devices of the group, wherein the respective OFDM data units are transmitted in respective sub-channel blocks allocated to the two or more communication devices of the group.

In yet another embodiment, a method for simultaneously communicating with multiple communication devices in a communication network includes obtaining, at a first communication device for each of two or more second communication devices in a group of second communication devices for orthogonal frequency division multiple access (OFDMA) communication, one or more quality indicators corresponding to one or more sub-channel blocks of an orthogonal frequency division multiplexing (OFDM) communication channel associated with the second communication device. The method also includes allocating, based on the quality indicators obtained for each of at least some of the two or more second communication devices of the group, respective sub-channel blocks to respective second communication devices of the group. The method additionally includes transmitting at least one orthogonal frequency division multiple access (OFDMA) data unit that includes respective OFDM data units directed to the two or more communication devices of the group, wherein the respective OFDM data units are transmitted in respective sub-channel blocks allocated to the two or more communication devices of group.

In still another embodiment, an apparatus for use in a communication system comprises a network interface configured to obtain, for each of two or more communication devices in a group of communication devices for orthogonal frequency division multiple access (OFDMA) communication, one or more quality indicators corresponding to one or more sub-channel blocks of an orthogonal frequency division multiplexing (OFDM) communication channel associated with the communication device. The network interface is additionally configured to allocate, based on the quality indicators obtained for each of at least some of the two or more communication devices of the two or more communication devices, respective sub-channel blocks to respective communication devices of the group. The network interface is further configured to transmit at least one orthogonal frequency division multiple access (OFDMA) data unit that includes respective OFDM data units directed to the two or more communication devices of the group, wherein the respective OFDM data units are transmitted in respective sub-channel blocks allocated to the two or more communication devices of group.

BRIEF DESCRIPTION OF THE DRAWINGS

FIGS. 2A, 2B, 2C, and 2D are diagrams illustrating example orthogonal frequency division multiplexing (OFDM) sub-channel blocks for an 80 MHz communication channel, according to an embodiment;

FIG. 4B is a diagram of a feedback packet that a transmitted during the sounding procedure of FIG. 4A, according to an embodiment.

FIG. 4C is a diagram of a feedback packet that a transmitted during the sounding procedure of FIG. 4A, according to another embodiment.

DETAILED DESCRIPTION

In embodiments described below, a wireless network device such as an access point (AP) of a wireless local area network (WLAN) simultaneously transmits independent data streams to multiple client stations and/or receives independent data streams simultaneously transmitted by multiple client stations. In particular, the AP transmits data for the multiple clients in different orthogonal frequency division multiplexing (OFDM) sub-channel blocks of an orthogonal frequency division multiple access (OFDMA) transmission, in an embodiment. Similarly, multiple client stations transmit data to the AP simultaneously, in particular, each client station transmits data in a different OFDM sub-channel block of an OFDMA transmission, in an embodiment.

In an embodiment, the AP is configured obtain, for each client station of a plurality of client stations, one or more quality indicators corresponding to one or more sub-channel blocks of an OFDM channel associated with the client station. Based on the one or more quality indicators of one or more sub-channel blocks received from each of one or more client stations, the AP selects client stations to be included in a group of client stations for OFDMA communication with the client stations and/or allocates respective sub-channel blocks to client stations in a group of client stations for OFDMA communication with the client stations. The AP then communicates with the client stations in a group of client station by simultaneously transmitting data to the client stations in the respective sub-channel blocks allocated to the client stations and/or receiving data simultaneously transmitted by the client stations in the respective sub-channel blocks allocated to the client stations, in an embodiment.

Figure 1:
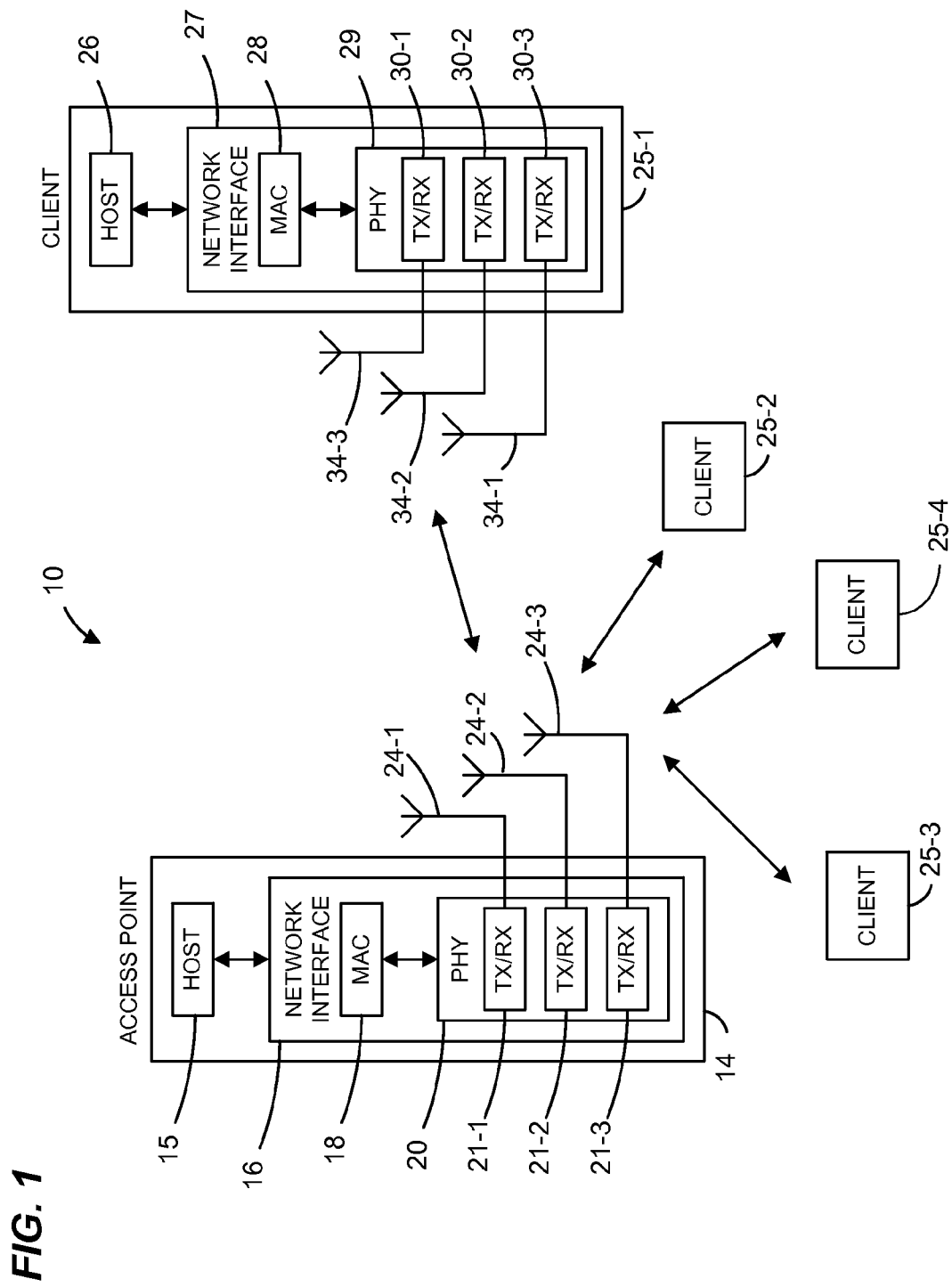
FIG. 1 a block diagram of an example wireless local area network (WLAN), according to an embodiment.

FIG. 1 is a block diagram of an example wireless local area network (WLAN) 10, according to an embodiment. An AP 14 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 includes different numbers (e.g., 1, 2, 4, 5, etc.) of transceivers 21 and antennas 24 in other embodiments.

The WLAN 10 includes a plurality of client stations 25. Although four client stations 25 are illustrated in FIG. 1, the WLAN 10 includes different numbers (e.g., 1, 2, 3, 5, 6, etc.) of client stations 25 in various scenarios and embodiments. Two or more of the client stations 25 are configured to receive corresponding data streams that are transmitted simultaneously by the AP 14. Additionally, two or more of the client stations 25 are configured to transmit corresponding data streams to the AP 14 such that the AP 14 receives the data streams simultaneously.

A client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 includes different numbers (e.g., 1, 2, 4, 5, etc.) of transceivers 30 and antennas 34 in other embodiments.

In an embodiment, one or more of the client stations 25-2, 25-3, and 25-4 has a structure the same as or similar to the client station 25-1. In these embodiments, the client stations 25 structured like the client station 25-1 have the same or a different number of transceivers and antennas. For example, the client station 25-2 has only two transceivers and two antennas (not shown), according to an embodiment.

In an embodiment, the AP 14 is configured to transmit different OFDM units to different client stations 25 simultaneously by forming an OFDMA data unit that includes the different OFDM data units modulated in respective sub-channel blocks of the OFDMA data unit. In an embodiment, the AP 14 allocates different sub-channels to different client stations and forms the OFDMA data unit that includes OFDM data units directed to by modulating the different client stations in sub-channel blocks corresponding to the sub-channels assigned to the client stations.

Figure 2A:
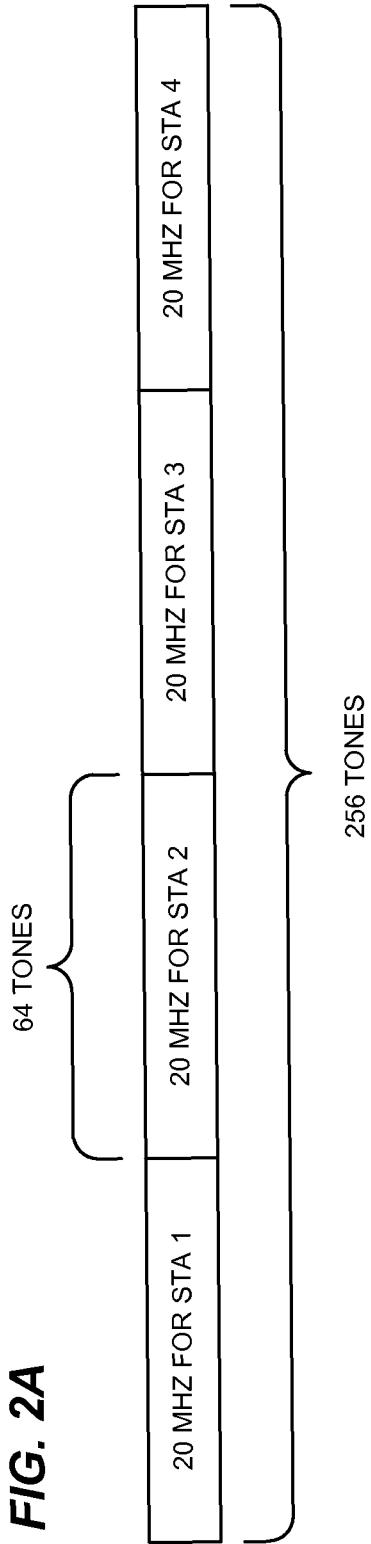
Figure 2B:
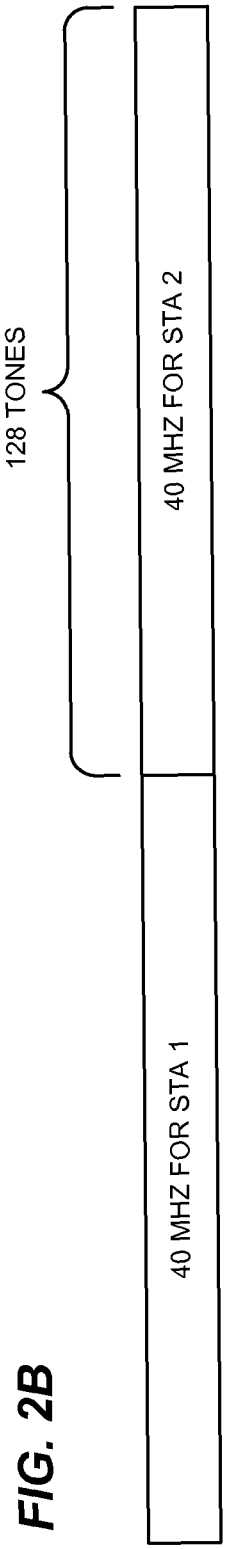

FIGS. 2A, 2B, 2C and 2D are diagrams illustrating example OFDM sub-channel blocks for an 80 MHz communication channel, according to an embodiment. In FIG. 2A, the communication channel is partitioned into four contiguous OFDM sub-channel blocks, each having a bandwidth of 20 MHz. The OFDM sub-channel blocks include independent data streams for four client stations. In FIG. 2B, the communication channel is partitioned into two contiguous OFDM sub-channel blocks, each having a bandwidth of 40 MHz. The OFDM sub-channel blocks include independent data streams for two client stations. In FIG. 2C, the communication channel is partitioned into three contiguous OFDM sub-channel blocks. Two OFDM sub-channel blocks each have a bandwidth of 20 MHz. The remaining OFDM sub-channel block has a bandwidth of 40 MHz. The OFDM sub-channel blocks include independent data streams for three client stations. In FIG. 2D, the communication channel is partitioned into four contiguous OFDM sub-channel blocks. Two OFDM sub-channel blocks each have a bandwidth of 10 MHz, one OFDM sub-channel block has a bandwidth of 20 MHz, and one sub-channel block has a bandwidth of 40 MHz. The OFDM sub-channel blocks include independent data streams for three client stations.

Although in FIGS. 2A, 2B, 2C, and 2D the OFDM sub-channel blocks are contiguous across the communication channel, in other embodiments the OFDM sub-channel blocks are not contiguous across the communication channel (i.e., there are one or more gaps between the OFDM sub-channel blocks). In an embodiment, each gap is at least as wide as one of the OFDM sub-channel blocks. In another embodiment, at least one gap is less than the bandwidth of an OFDM sub-channel block. In another embodiment, at least one gap is at least as wide as 1 MHz. In an embodiment, different OFDM sub-channel blocks are transmitted in different channels defined by the IEEE 802.11a and/or 802.11n Standards. In one embodiment, the AP includes a plurality of radios and different OFDM sub-channel blocks are transmitted using different radios.

Figure 3:
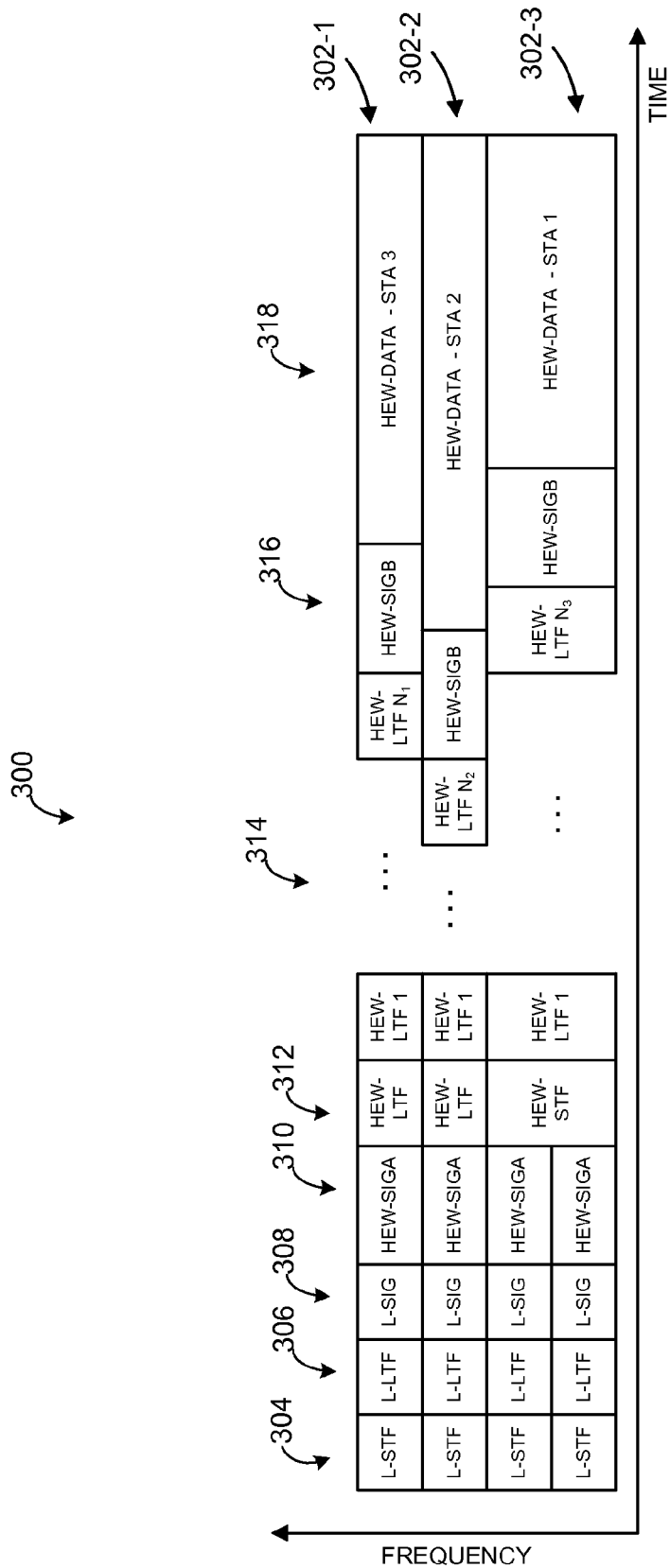
FIG. 3 is a diagram of an example OFDMA data unit, according to an embodiment.

FIG. 3 is a diagram of an example OFDMA data unit 300, according to an embodiment. The OFDMA data unit 300 includes a plurality of OFDM data unit 302-1, 302-2 and 302-3. In an embodiment, the AP 14 transmits the OFDM data units 302-1, 302-2, 302-3 to different client stations 25 via respective OFDM sub-channels within the OFDMA data unit 300. In another embodiment, different client stations 25 transmit respective OFDM data units 302-1, 302-2, 302-3 to the AP 14 in respective OFDM sub-channels within the OFDMA data unit 300. In this embodiment, The AP 14 receives the OFDM data units 302-1, 302-2, 302-3 from the client stations 25 via respective OFDM sub-channels of within the OFDMA data unit 300, in this embodiment.

Each of the OFDM data units 302-1, 302-2, 302-3 conforms to a communication protocol that supports OFDMA transmission, such as the HEW communication protocol, in an embodiment. In an embodiment in which the OFDMA data unit 300 corresponds to a downlink OFDMA data unit, the OFDMA data unit 300 is generated by the AP 14 such that each OFDM data unit 302 is transmitted to a respective client station 25 via a respective sub-channel of the WLAN 10 allocated for downlink transmission of the OFDMA data unit 300 to the client station. Similarly, an embodiment in which the OFDMA data unit 300 corresponds to an uplink OFDMA data unit, the AP 14 receives the OFDM data units 302 via respective sub-channels of the WLAN 10 allocated for uplink transmission of the OFDM data units 302 from the client stations, in an embodiment. For example, the OFDM data unit 302-1 is transmitted via a first 20 MHZ sub-channel of the WLAN 10, the OFDM data unit 302-2 is transmitted via a second 20 MHz sub-channel of the WLAN 10, and the OFDM data unit 302-3 is transmitted via a 40 MHz sub-channel of the WLAN 10, in the illustrated embodiment.

In an embodiment, each of the OFDM data units 302 includes a preamble including one or more legacy short training fields (L-STF) 304, one or more legacy long training fields (L-LTF) 306, one or more legacy signal fields (L-SIG) 308, one or more first high efficiency WLAN signal field (HEW-SIG-A) 310, N HEW long training fields (HEW-LTF) and a second HEW signal field (HEW-SIGB) 314. Additionally, each OFDM data unit 302 includes a high efficiency WLAN data portion (HEW-DATA) 318. In an embodiment, each L-LSF field 306, each L-LTF field 308, each L-SIG field 310 and each HEW-SIGA field 312 occupies a smallest bandwidth supported by the WLAN 10 (e.g., 20 MHz). In an embodiment, if an OFDM data unit 302 occupies a bandwidth that is greater than the smallest bandwidth of the WLAN 10, then each L-LSF field 306, each L-LTF field 308, each L-SIG field 310 and each HEW-SIGA field 312 is duplicated in each smallest bandwidth portion of the OFDM data unit 302 (e.g., in each 20 MHz portion of the data unit 302). On the other hand, each HEW-STF field 312, each HEW-LTF field 314, each HEW-SIGB field 316 and each HEW data portion 318 occupies an entire bandwidth of the corresponding OFDM data unit 302, in an embodiment. For example, the OFDM data unit 302-3 occupies 40 MHz, wherein L-LSF field 306, the L-LTF field 308, L-SIG field 310 and HEW-SIGA fields 312 is duplicated in the upper and the lower 20 MHz bands of the OFDM data unit 302-3, while each of the HEW-STF field 312, each of the HEW-LTF fields 314, each of the HEW-SIGB field 316 and each of the HEW data portion 318 occupies the entire 40 MHz bandwidth of the data unit 302, in the illustrated embodiment.

In an embodiment, padding is used in one or more of the OFDM data units 302 to equalize lengths of the OFDM data units 302. Accordingly, the length of each of the OFDM data units 302 correspond to the length of the OFDMA data unit 302, in this embodiment. Ensuring that the OFDM data units 302 are of equal lengths synchronizes transmission of acknowledgment frames by client stations 25 that receive the data units 302, in an embodiment. In an embodiment, each of one or more of the OFDM data units 302 is an aggregate MAC service data units (A-MPDU), which is in turn included in a PHY protocol data unit (PPDU). In an embodiment, padding (e.g., zero-padding) within one or more of the A-MPDUs 302 is used to equalize the lengths of the data units 302, and to synchronize transmission of acknowledgement frames corresponding to the OFDMA data unit 300.

In various embodiments, the AP 14 obtains, for each client station 25 of a plurality of client stations 25, one or more quality indicators corresponding to one or more sub-channel blocks of the communication channel associated with the client station 25. Examples of quality indicators that the AP 14 obtains include (i) a respective channel response indicator corresponding to each of one or more sub-channel blocks, (ii) a respective signal strength indicator corresponding to each of one or more sub-channel blocks, (ii) a respective signal to noise ratio (SNR) or signal to interference plus noise ratio (SNIR) indicator corresponding to each of one or more sub-channel blocks, (iv) an indicator corresponding to a "best" sub-channel block, (v) a respective indicator corresponding to order of preference of each of one or more sub-channel blocks, etc., in various embodiments and/or scenarios. Then, based on the one or more quality indicators obtained for each client station 25 of the plurality of client stations 25, the AP 14 selects groups of client stations 25 for OFDMA communication with the client stations 25 and/or allocates respective sub-channel blocks to respective client stations 25 in a group of client stations 25 selected for OFDMA communication with the client stations 25. The AP 14 then transmits at least one OFDMA data unit to a group of client stations 25, wherein the OFDMA data unit includes respective OFDM data units directed to the client stations 25 of the group of client stations 25, in an embodiment. The respective OFDM data units are transmitted to the client stations 25 in respective sub-channel blocks allocated to the client station 25, in an embodiment. Similarly, in an embodiment, the AP 14 receives at least one OFDMA data unit from the group of client stations 25, wherein the OFDMA data unit includes respective OFDM data units transmitted by the client stations 25 in respective sub-channel blocks allocated to the client station 25, in an embodiment. To this end, the AP 14 provides, in some manner, to a group of client stations 25 indications of the respective sub-channel blocks allocated to the client stations 25, in an embodiment.

In an embodiment, the AP 14 obtains the one or more quality indicators corresponding to one or more sub-channel blocks of a communication channel associated with a client station 25 based on sounding of the communication channel associated with the client station 25. For example, in an embodiment, the AP 14 explicitly sounds a communication channel associated a client station 25 by transmitting one or more training signals to the client stations 25 and, in response, receiving feedback from the client station 25. The feedback includes the one or more quality indicators corresponding to one or more sub-channel blocks of the communication channel, or includes indications of channel characteristics that allow the AP 14 to determine the one or more quality indicators, in various embodiments. In some embodiments, the AP 14 obtains the one or more quality indicators corresponding to one or more sub-channel blocks of a communication channel associated with a client station 25 based on implicit sounding of the communication channel. In such embodiments, the AP 14 obtains channel characteristics of a reverse channel from a client station 25 to the AP 14 based on training signal transmitted by the client station 25 to the AP 14. The AP 14 then determines characteristics of the forward channel based on the characteristics of the reverse channel by assuming channel reciprocity, and obtains the one or more quality indicators corresponding to one or more sub-channel blocks based on the characteristics of the forward channel, in some embodiments. To ensure channel reciprocity, the AP 14 conducts a suitable calibration procedure to calibrate the receive and transmit radio frequency (RF) chains of the AP 14, in some embodiments. In some embodiments, the AP 14 obtains the one or more quality indicators corresponding to one or more sub-channel blocks directly based on characteristics of the reverse channel, without obtaining characteristics of the forward channel. For example, in an embodiment, the AP 14 obtains signal strength, signal to noise ratio, etc. associated with the one or more sub-channel blocks directly based on the training signals received from the client station 25 in the reverse communication channel.

Figure 4A:
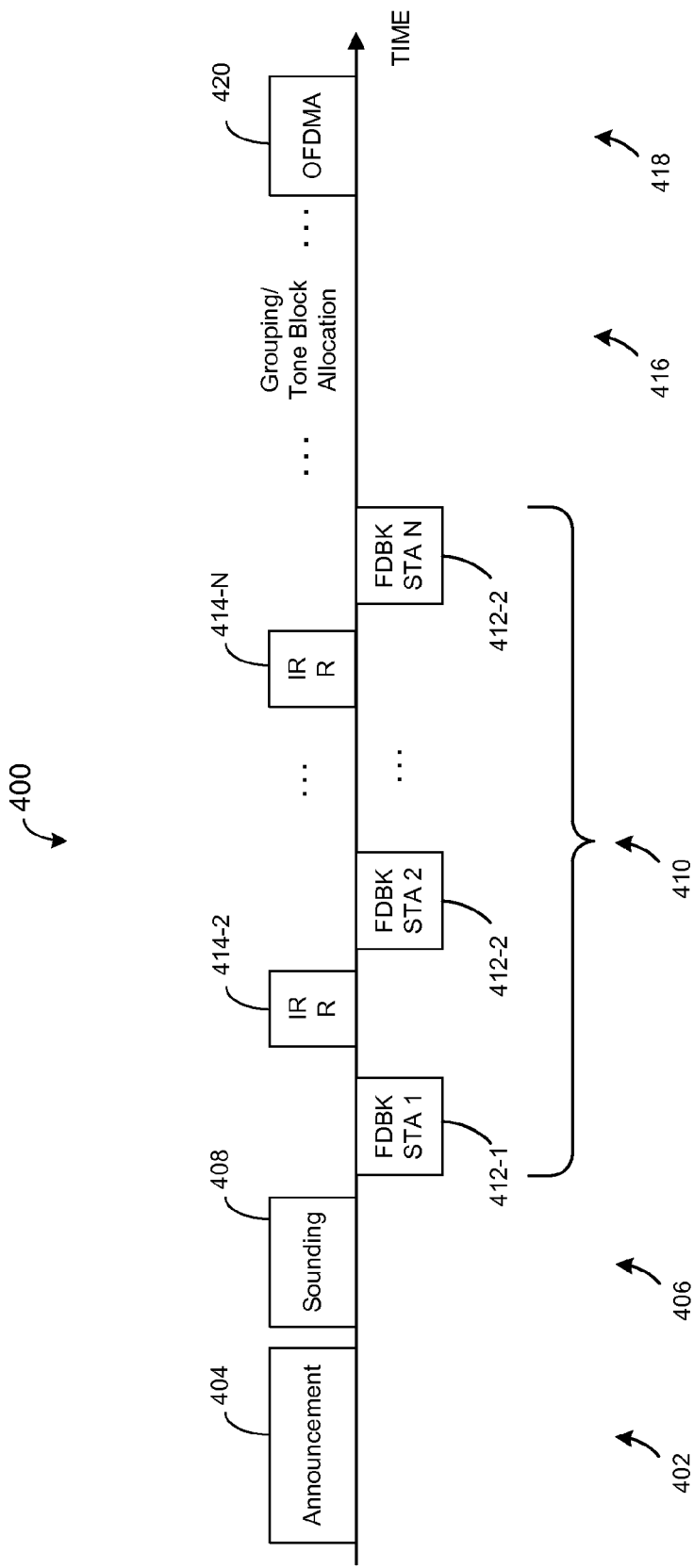
FIG. 4A is a timing diagram of an example explicit sounding procedure and transmission of an example OFDMA data unit formed according to grouping and/or channel allocation determined based on the explicit sounding procedure, according to an embodiment.

FIG. 4A is a timing diagram of an example sounding procedure 400 and transmission of an example OFDMA data unit formed according to grouping and/or channel allocation determined based on the sounding procedure 400, according to an embodiment. The sounding procedure 400 is an explicit sounding procedure in which the AP 14 transmits a sounding packet to each of a plurality of client stations 25 and receives, from each of the plurality client stations 25, feedback containing channel state information and/or other indications corresponding to a forward communication channel from the AP 14 to the client station 25.

During a time interval 402, the AP 14 transmits an announcement frame 404 to a plurality of client stations 25 to initiate the sounding procedure 400 with the client stations 25. The announcement frame 404 identifies client stations 25 that are the intended participants in the sounding procedure 400, in an embodiment. The announcement frame 404 is a null data packet (NDP) that omits a payload, in an embodiment. In another embodiment, the announcement frame 404 includes a payload. In an embodiment, the announcement frame 404 identifies client stations 25 as intended participants in the sounding procedure 400 by including a suitable identifier, such as at least a portion of an association identifier (AID), corresponding to each of the client stations 25 identified as an intended participant. In an embodiment, the announcement frame 402 also indicates a length or a duration corresponding to the sounding procedure 400, for example to protect the sounding procedure 400 from transmissions by communication devices that are not intended participants in the sounding procedure 400. In an embodiment, each client station 25 identified by announcement frame 404 determines, based on detecting its own AID in the announcement frame 404, that the client station 25 is an intended participant in the sounding procedure 400. In the event that the management frame 404 does not include the AID of a particular client station 25, that client station 25 determines that it is not an intended participant in the sounding procedure 400 and refrains from accessing the channel for the duration indicated by the announcement frame 404, in an embodiment.

During a time interval 406, the AP 14 transmits a sounding frame 408 that includes one or more training signals that allow each client station 25 to obtain a measure of the forward communication channel from the AP 14 to the client station 25. In an embodiment, the sounding frame 404 is a null data packet that includes the one or more training signals in a PHY preamble of the data unit, and omits a payload. In another embodiment, the sounding frame 404 includes a PHY preamble and a payload portion. In an embodiment, each of the client station 25 identified by the announcement frame 408 obtains, based on training information included in the sounding frame 408, a channel description characterizing the communication channel between the AP 14 and the client station 25 and/or quality of one or more of the sub-channel blocks of the communication channel between the AP 14 and the client station 25. For example, each client station 25 obtains channel state information (e.g., the gain, the phase, the signal to noise ratio (SNR), etc.) characterizing the communication channel between the AP 14 and the client station 25 over the entire bandwidth of the communication channel, in an embodiment. Additionally or alternatively, in an embodiment, each client station 25 determines channel quality indicators (e.g., SNR, SNIR, signal strength, etc.) corresponding to each sub-channel block of the communication channel between the AP 14 and the client station 25. In some embodiments, each client station 25 identifies one or more preferred sub-channel blocks for the client station 25, and determines an order of preference of the identified preferred sub-channel blocks.

During a time intervals 410, the client stations 25 transmit respective feedback packets 414 to the AP 14. In an embodiment, a feedback packet 414 from a particular client station 25 includes one or more of (i) indications of one or more preferred sub-channel blocks identified by the particular station 25, (ii) indications of order of preference of multiple preferred sub-channel blocks identified by the particular station 25 (iii) one or more channel quality indicators, such as channel state information (CSI) or other suitable channel characteristics, corresponding to each of one or more sub-channel blocks of the communication channel between the AP 14 and the particular client station 25, (iv) CSI or other suitable channel description corresponding to the entire bandwidth of the communication channel between the AP 14 and the particular client station 25, such as CSI corresponding to each sub-carrier or CSI corresponding to each group of sub-carriers of the communication channel between the AP 14 and the particular client station 25 (v) SNR corresponding to the entire bandwidth of the communication channel between the AP 14 and the particular client station 25, etc.

In an embodiment, a client station 25 (e.g., the client stations 25-1) identified first in the announcement frame 402 transits its feedback packet 412-1 during a time interval that begins upon expiration of a certain predetermined time interval, such as a time interval corresponding to SIFS or another suitable predetermined time interval, after completion of reception of the sounding packet 404 by the client station 25. The AP 14 receives the feedback packet 412-1 from the first client station 25 and successively polls for feedback from each of the remaining client stations 25 identified by the announcement frame 404 as participants in the sounding procedure 400, in an embodiment. For example, the AP successively transmits respective immediate response request (IRR) frames 414 to each of the remaining client stations 25 identified by the announcement frame 404 as participants in the sounding procedure 400, in an embodiment. Each of the remaining client stations 25 transmits its feedback packet 412 during a time interval that begins upon expiration of a certain predetermined time interval, such as a time interval corresponding to SIFS or another suitable time interval, after completion of reception by the client station 25 the IRR frame 414 directed to the client station 25, in an embodiment.

Based on the feedback packets 412 received by the AP 14 during the time interval 410, the AP 14 obtains one or more quality indicators corresponding to one or more sub-channel blocks of the communication channel between the AP 14 and each of the client stations 25 that participated in the sounding procedure 400, in an embodiment. For example, the AP 14 obtains the one more quality indicators for a particular client station 25 directly from the feedback packet 414 received from the particular client station 25, in an embodiment. In another embodiment, the AP 14 determines the one or more quality indicators for a particular client station 25 based on data included in the feedback packet 412 received from the client station 25, such as based on CSI or other channel description included in the feedback packet 412 received from the client station 25. During a time interval 416, based on the quality indicators obtained for at least some of the client stations 25, the AP 14 selects one or more groups of client stations 25 for OFDMA communication with the client statins 25 and/or allocates respective sub-channel blocks to client stations 25 selected as members of a group of client stations 25 for OFDMA communication with the client statins 25, in an embodiment. During a time interval 418, the AP 14 transmits an OFDMA data unit 420 to a group of client stations 25 selected as members of a group of client stations 25 for OFDMA communication with the client statins 25, in an embodiment. The OFDMA data unit 420 includes respective OFDM data units directed to the client stations 25 of the group, wherein the respective OFDM data units are transmitted to the client statins 25 in the respective sub-channel blocks allocated to the client stations 25, in an embodiment.

With continues reference to FIG. 4A, in some embodiments, sounding procedure 400 is used for the purpose of beamforming as well as OFDMA communication. For example, in addition to generating feedback related to quality of sub-channel blocks for OFDMA communication, each client station 25 develops, based on the training signals in the sounding packet 408, beamforming feedback, and provides the beamforming feedback to the AP 14. For example, each feedback packet 412 includes beamforming feedback in addition to the feedback related to OFDMA communication, in an embodiment. FIG. 4B is a diagram of a feedback packet 450 that a client station 25 is configured to transmit to the AP 14 during the sounding procedure 400 of FIG. 4A, according to one such embodiment. In an embodiment, the feedback packet 450 corresponds to each of the feedback packets 412 of FIG. 4A. In an embodiment, the feedback packet 450 is generated by a client station 25 in response to receiving a sounding packet transmitted by the AP 14 to the client station 25. For example, the PHY processing unit 29 of the client station 25-1 is configured to generate feedback packets such as the feedback packet 450, in an embodiment.

The feedback packet 450 includes a MIMO control field 452, a beamforming feedback portion 454 and an OFDMA feedback portion 456. The beamforming feedback portion 452 includes an average SNR subfield 458, a beamforming feedback sub-field 460 and a per-tone SNR sub-field 462. The beamforming feedback sub-field 460 includes some form of beamforming feedback generated at the client station 25 based on a sounding packet transmitted by the AP 14 to the client station 25, in various embodiments. For example, in an embodiment, the beamforming feedback sub-field 460 includes compressed steering feedback. For example, the beamforming feedback sub-field 460 includes compressed steering feedback for multi-user (MU) multiple input multiple output (MIMO) as defined in the IEEE 802.11 ac standard. In another embodiment, the beamforming feedback sub-field 460 includes another suitable form of beamforming feedback, such as channel estimate feedback or uncompressed steering matrix feedback, for example. In an embodiment, each of the average SNR subfield 458, the beamforming feedback sub-field 460 and the per-tone SNR sub-field 462 includes feedback that covers the entire bandwidth of the communication channel. In an embodiment, each of the average SNR subfield 458, the beamforming feedback sub-field 460 and the per-tone SNR sub-field 462 includes feedback that covers the bandwidth of the sounding packet based on which the beamforming feedback was generated by the client station 25.

The OFDMA feedback portion 456 includes OFDMA feedback as described above with respect to FIG. 4A, in an embodiment. For example, the OFDMA portion 456 includes one or more of (i) indications of one or more preferred sub-channel blocks identified by the client station 25 based on the sounding frame transmitted by the AP 14 to the client station 25, (ii) indications of order of preference of multiple preferred sub-channel blocks identified by the particular station 25 based on the sounding frame based on the sounding frame transmitted by the AP 14 to the client station 25 (iii) one or more channel quality indicators, such as CSI or other suitable channel quality indicators, corresponding to each of one or more sub-channel blocks of the communication channel between the AP 14 and the client station 25, (iv) CSI corresponding to the entire bandwidth of the communication channel between the AP 14 and the client station 25, such as CSI corresponding to each sub-carrier or CSI corresponding to each group of sub-carriers of the communication channel between the AP 14 and the client station 25, and (v) SNR corresponding to the entire bandwidth of the communication channel between the AP 14 and the particular client station 25.

In an embodiment, the feedback packet 450 omits one or more of the average SNR subfield 458, the beamforming feedback sub-field 460 and the per-tone SNR sub-field 460. In an embodiment, the feedback packet 450 omits the entire beamforming feedback portion 452. For example, the feedback packet 450 omits the entire beamforming feedback portion 452 in an embodiment in which the AP 14 includes a single transmit antenna and/or if the AP 14 is not configured to perform beamforming or is not configured to perform multi-user beamforming.

In some embodiments, at least a portion of OFDMA feedback is included in the MIMO control field 452 of the feedback packet 540. For example, indications of one or more preferred sub-channel blocks are included in the MIMO control field 452. In some such embodiments, the feedback packet 450 omits the OFDMA feedback portion 454.

FIG. 4C is a diagram of a feedback packet 470 that a client station 25 is configured to transmit to the AP 14 during the sounding procedure 400 of FIG. 4A, according to another embodiment. In an embodiment, the feedback packet 470 corresponds to a feedback packet 412 of FIG. 4A. The feedback packet 470 is generally the same as the feedback packet 450, except that a beamforming portion 470 includes a beamforming feedback portion 474 that covers a bandwidth that corresponds to the one or more sub-channel blocks indicated by the OFDMA feedback portion 456.

Figure 5:
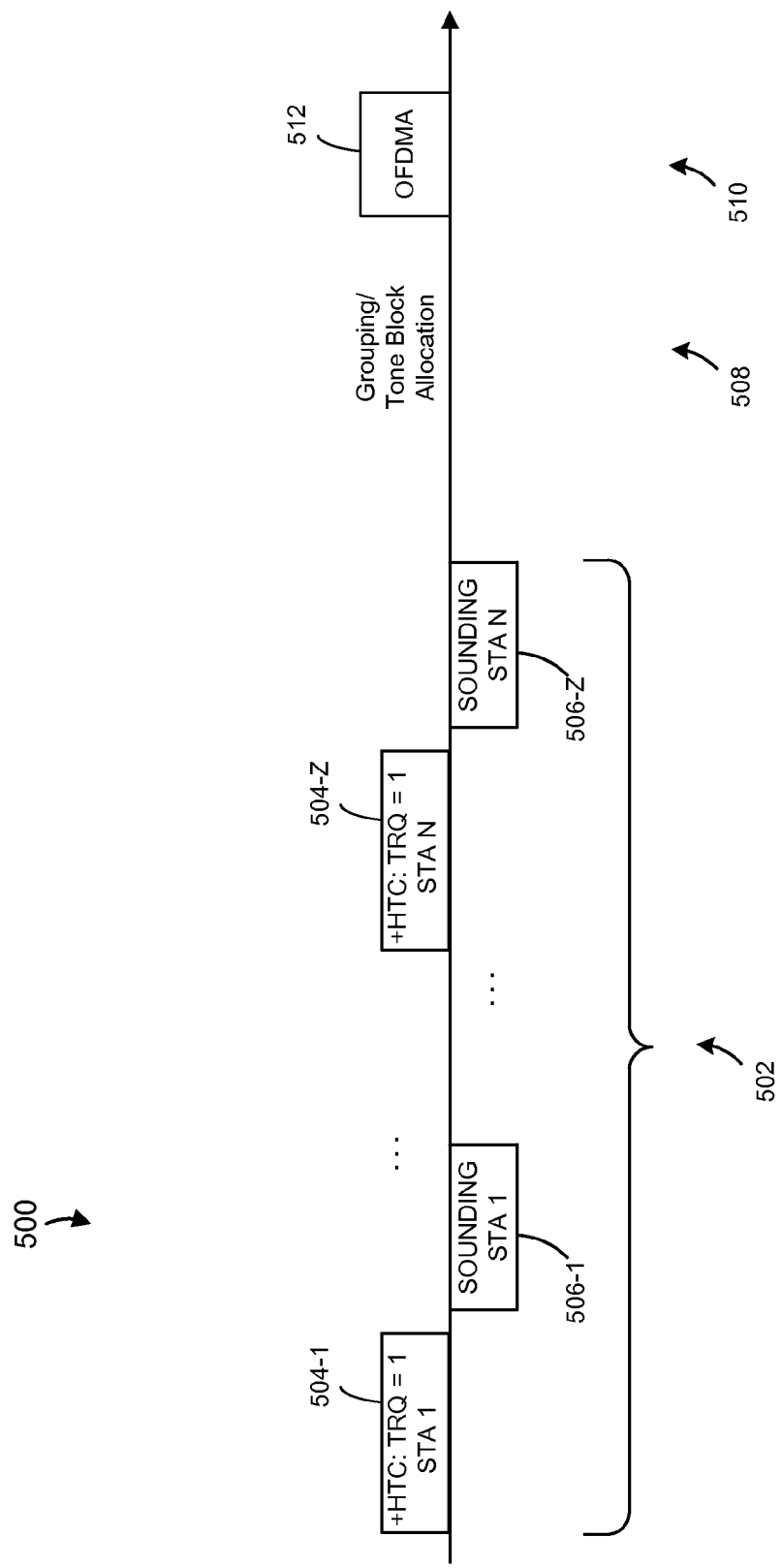
FIG. 5 is a timing diagram of an example implicit sounding procedure and transmission of an example OFDMA data unit formed according to grouping and/or channel allocation determined based the implicit sounding procedure, according to an embodiment.

FIG. 5 is a timing diagram of an example sounding procedure 500 and transmission of an example OFDMA data unit formed according to grouping and/or channel allocation determined based the sounding procedure 500, according to an embodiment. The sounding procedure 500 is an implicit sounding procedure in which the AP 14 requests transmission of one or more training signals from each client station 25 of a plurality of client stations 25. The AP 14 receives the requested one or more training signals from each of the plurality of client stations 25, and obtains, for each of the client stations 25, one or more quality indicators corresponding to one or more sub-channel blocks of the communication channel associated with the client station 25, in an embodiment.

Referring to FIG. 5, during a time interval 502, the AP 14 sequentially transmits respective control frames 504 to each of a plurality of client stations 25. Each control frame 504 is directed to a particular client station 25 and includes a request for transmission of one or more training signals by the client station 25. In response to receiving the respective control frames 504, the client stations 25 transmit respective sounding frames 506 to the AP 14. Each sounding frame 506 includes one or more training signals, in an embodiment. For example, each sounding frame 504 includes one or more training fields in a preamble portion of the sounding frame 504. In an embodiment, each sounding frame 504 is an NDP that omits a payload. In another embodiment, each sounding frame 504 includes a payload. Each client station 25 transmits its sounding frame 506 upon expiration of a certain predetermined time period, such as a time period corresponding to SIFS or another predetermined time period, after completion of reception of the corresponding control frame 504 by the client station 25, in an embodiment.

The AP 14 receives a sounding frame 504 from a client station 25 and obtains, based on the sounding frame 504, one or more quality indicators corresponding to one or more sub-channel blocks of the communication channel between the AP and the client station 25. For example, the AP 14 obtains, based on the sounding packet 504, an estimate of the reverse communication channel from the client station 25 to the AP 14, in an embodiment. The estimate of the reverse channel can be represented, for example, in a matrix format as a two-dimensional channel matrix H that specifies, in each element, a channel gain parameter for a spatial stream defined by a transmit antenna of the client station 25 and a receive antenna of the AP 14. In an embodiment, the AP 14 determines an estimate of the forward communication channel from the AP 14 to the client station 25 based on the reverse communication channel from the client station by assuming channel reciprocity. For example, the AP 14 obtains an estimate of the forward channel by transposing the channel matrix H obtained for the reverse channel. The AP 14 then obtains respective quality indicators corresponding to one or more sub-channel blocks of the commination channel based on the forward channel estimate corresponding to the channel. In an embodiment the AP 14 obtains a reverse and forward channel estimate corresponding to each OFDM tone of the communication channel or a subset of OFDM tones, such as each second OFDM tone, each $4^{th}$ OFDM tone, or any other suitable subset of OFDM tones of the communication channel. The AP 14 then obtains the quality indicators corresponding to each sub-channel blocks of the communication channel based on channel estimates corresponding to OFDM tones included in the sub-channel block, in an embodiment.

In another embodiment, the AP 14 obtains, from training data included in the sounding packet 504, a measure indicative of quality of the reverse communication channel, such a measure of signal strength, signal to noise ratio, etc. associated with the communication channel. In an embodiment, the AP 14 obtains such measure for each sub-carrier or each group of sub-carriers of the communication channel, and obtains the channel quality indicators corresponding to one or more sub-channel blocks based on the measure of the reverse communication channel. In an embodiment, the AP 14 selects one or more "best" or "preferred" sub-channel blocks for each of the stations 25. In an embodiment, the AP 14 ranks one or more sub-channel blocks in order of preference for each of the client stations 25. Examples of quality indicators that the AP 14 obtains for one or more sub-channel blocks include one or more of (i) a respective channel response indicator corresponding to each of one or more sub-channel blocks, (ii) a respective signal strength indicator corresponding to each of one or more channel blocks, (ii) a respective SNR or SNIR indicator corresponding to each of one or more sub-channel blocks, (iv) an indicator corresponding to a "best" sub-channel block, (v) a respective indicator corresponding to order of preference of each of one or more sub-channel blocks.

During a time interval 508, based on the quality indicators obtained based on the sounding procedure 500, the AP 14 selects one or more groups of client stations 25 for OFDMA communication with the client statins 25 and/or allocates respective sub-channel blocks to client stations 25 selected as members of a group of client stations 25 for OFDMA communication with the client statins 25. During a time interval 510, the AP 14 transmits an OFDMA data unit 512 to a group of client stations 25 selected as members of a group of client stations 25 for OFDMA communication with the client statins 25. The OFDMA data unit 512 includes respective OFDM data units directed to the client stations 25 of the group, wherein the respective OFDM data units are transmitted to the client statins 25 in the respective sub-channel blocks allocated to the client stations 25, in an embodiment.

In some embodiments, the implicit sounding procedure 500 is conducted by the AP 14 for the purpose of beamforming as well as for OFDMA group selection and/or sub-channel block allocation. For example, the AP 14 is configured to determine a transmit beamsteering matrix for use in transmitting to one or more client stations 25 based on the sounding packets 506 received from the one or more client stations 25, in an embodiment.

Figure 6:
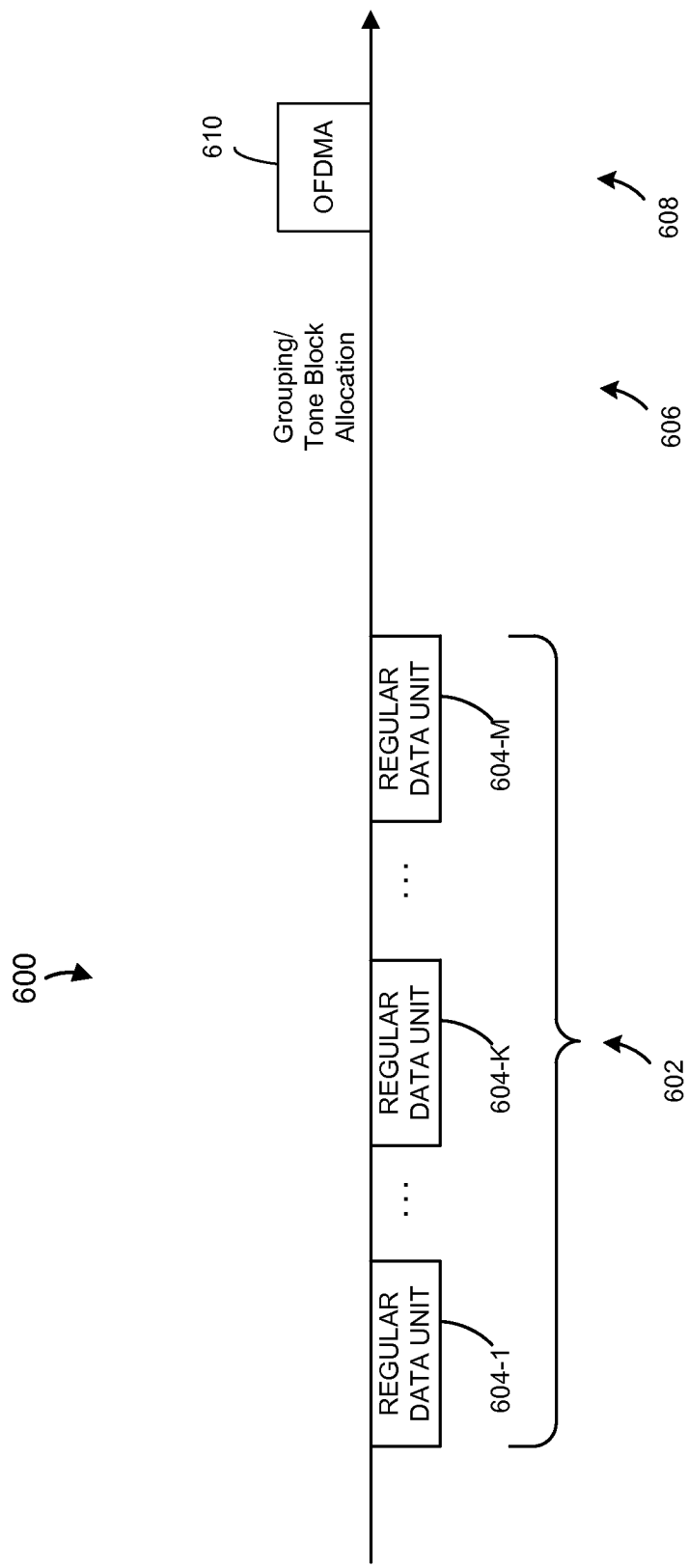
FIG. 6 is a timing diagram of an example transparent implicit sounding procedure and transmission of an example OFDMA data unit formed according to grouping and/or channel allocation determined based the transparent implicit sounding procedure, according to an embodiment.

FIG. 6 is a timing diagram of an example sounding procedure 600 and transmission of an example OFDMA data unit formed according to grouping and/or channel allocation determined based the sounding procedure 600, according to an embodiment. The sounding procedure 600 is a transparent implicit sounding procedure in which the AP 14 obtains one or more quality indicators corresponding to one or more sub-channel blocks of a communication channel associated with a client station 25 based on one or more "regular" data units received from the client station 25.

In an embodiment, during a time interval 602, the AP 14 receives a plurality of regular data units 604 from a plurality of client stations 25. Each regular data unit 604 includes one or more training signals (e.g. in a preamble portion of the regular data unit) that allow the AP 14 at least practically characterize the reverse channel from a corresponding client station 25 to the AP 14.

As used herein, a regular data unit is a non-sounding data unit used in any procedure other than channel sounding, e.g., data exchange, modulation and coding scheme (MCS) feedback, etc. In an embodiment, each regular data unit 604 is a communication frame, a data packet, etc. In an embodiment, the regular data units 604 are generally not sounding physical layer convergence procedure (PLCP) protocol data unit (PPDU) or null data packets (NDP) used specifically for sounding. In some embodiments, the regular data units 604 do not include respective indications that the data units 604 are for sounding a communication channel (while data units used for sounding communication channels include such an indication). Further, in some embodiments, the regular data units 604 include explicit respective indications that the data units 604 are not for sounding the communication channel. Still further, in some embodiments, the regular data units 604 are not transmitted in response to a request to transmit a sounding packet. A client stations 25 transmits a regular data unit 604 for a purpose unrelated to sounding the communication channel. For example, in an embodiment, a regular data unit 604 is a data packet that includes a data payload. The implicit channel sounding procedure is therefore transparent to the client stations 25.

In some embodiments, a client station 25 transmits a data unit 604 using multiple spatial streams, and the data unit 604 accordingly includes information (e.g., training fields in the physical layer (PHY) preamble) that can be used to obtain channel characteristics of the reverse channel from the client station 25 to the AP 14. For example, the data unit 604 can include a payload transmitted over three spatial streams and, accordingly, three training fields in the PHY preamble to enable the AP 14 to properly process the payload.

In an embodiment, the AP 14 obtains, based on training information included in the regular data unit 604, channel state information (CSI) that describes one or more characteristics of each spatial stream associated with the reverse channel (e.g., gain, phase, SNR, etc.). The CSI can be represented, for example, in a matrix format as a two-dimensional channel matrix H that specifies, in each element, a channel gain parameter for a spatial stream defined by the corresponding transmit antenna and a receive antenna. To generate an estimate of the forward channel, in an embodiment, the AP 14 calculates the transpose of the matrix that describes the reverse channel. In doing so, the AP 14 assumes that the MIMO channel between the AP 14 and the client station 25 is symmetrical so that the forward channel and the reverse channel can be considered to be reciprocal.

In some embodiments, a regular data unit 604 received from a client station 25 in some cases includes fewer training fields than spatial dimensions associated with the communication channel associated with the client station 25. In an embodiment, the AP 14 obtains a measure partially characterizing the communication channel, and obtains the one or more quality indicators corresponding to one or more sub-channel blocks of the communication channel based on the measure partially characterizing the communication channel. In some embodiment, the AP 14 does not use every regular data unit received from a client station 25 to obtain characteristics of the communication channel between the AP 14 and the client station 24. For example, the AP 14 selects regular data units based on which to obtain characteristics of the communication channel according to one or more suitable selection criteria. For example, the AP 14 selects regular data units transmitted by a client station 25 using all spatial dimensions associated with the communication channel between the AP 14 and the client station 25, in an embodiment.

In an embodiment the AP 14 obtains, based on one or more data units 604, characteristics of a communication channel corresponding to each OFDM tone of the communication channel or a subset of OFDM tones, such as each second OFDM tone, each $4^{th}$ OFDM tone, or any other suitable subset of OFDM tones of the communication channel. The AP 14 then obtains the quality indicators corresponding to each sub-channel blocks of the communication channel based on channel estimates corresponding to OFDM tones included in the sub-channel block, in an embodiment.

During a time interval 606, based on the quality indicators obtained based on the sounding procedure 600, the AP 14 selects one or more groups of client stations 25 for OFDMA communication with the client statins 25 and/or allocates respective sub-channel blocks to client stations 25 selected as members of a group of client stations 25 for OFDMA communication with the client statins 25. During a time interval 608, the AP 14 transmits an OFDMA data unit 610 to a group of client stations 25. The OFDMA data unit 610 includes respective OFDM data units directed to the client stations 25 of the group, wherein the respective OFDM data units are transmitted to the client statins 25 in the respective sub-channel blocks allocated to the client stations 25, in an embodiment.

In some embodiments, the transparent implicit sounding procedure 600 is conducted by the AP 14 for the purpose of beamforming as well as for OFDMA group selection and/or sub-channel block allocation. For example, the AP 14 is configured to determine a transmit beamsteering matrix for use in transmitting to one or more client stations 25 based on training data included on the data units 604 received from the client stations 25, in an embodiment.

Figure 7:
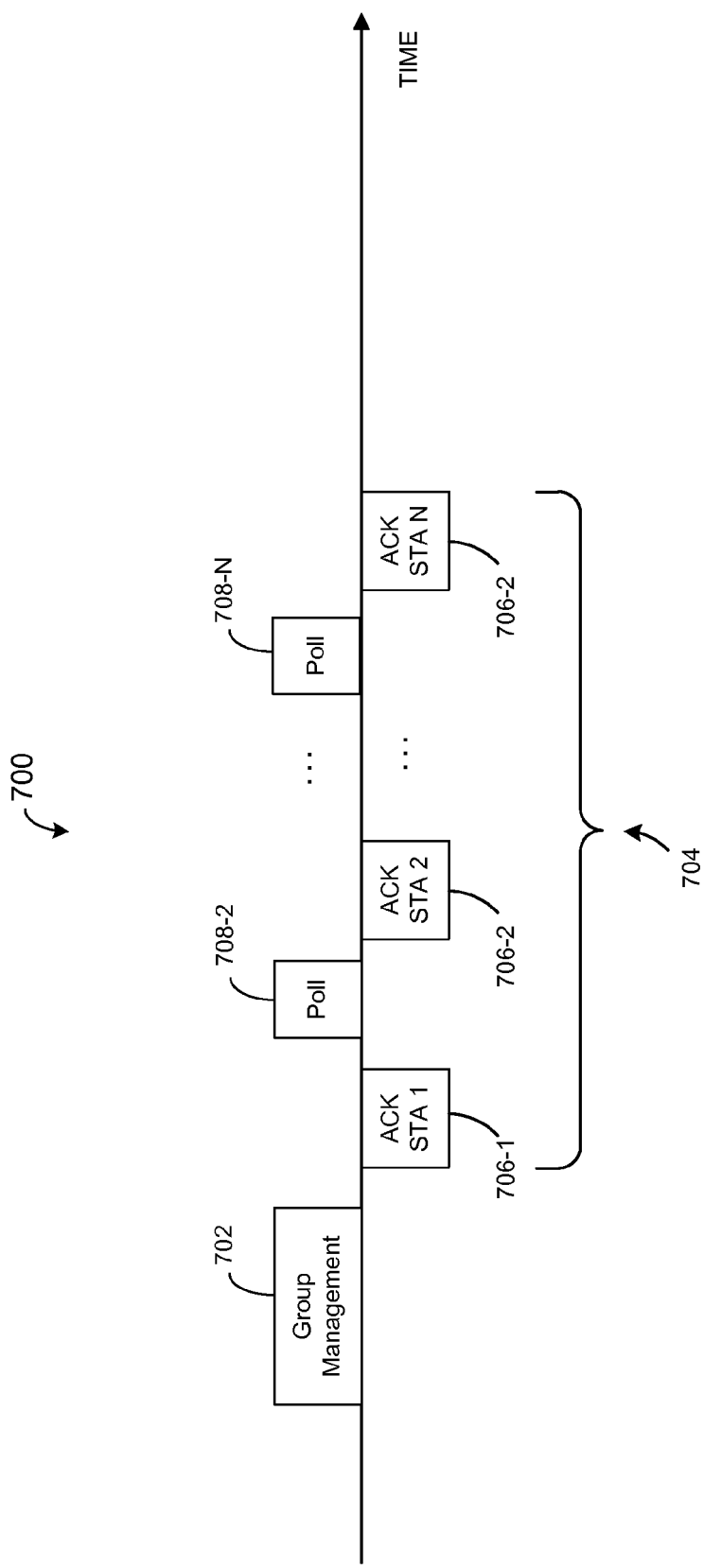
FIG. 7 is a timing diagram illustrating a notification procedure used by an AP to inform a plurality of client stations that the client stations are members of a group of client stations for OFDMA communication, according to an embodiment.

In various embodiments, prior to transmitting an OFDMA data unit to a group of client stations 25, the AP 14 informs, or notifies, the client stations 25 that the client stations 25 are members of a group of client stations 25 for OFDMA communication with the client stations 25. FIG. 7 is a timing diagram illustrating a notification procedure 700 used by the AP 14 to inform a plurality of client stations 25 that the client stations 25 are members of a group of client stations 25 for OFDMA communication, according to an embodiment. The AP 14 transmits a group management frame 702 to a plurality of client stations 25. The group management frame 702 informs the plurality of client statins 25 that the client stations 25 are members of a group for OFDMA communication with the client stations 25. In an embodiment, the group management frame 702 includes a group number field and a plurality of station identification fields. Each station identification field includes an identifier, such as, for example, an association identifier (AID) or a partial AID, associated with a particular client station 25. Each client station 25 that receives the group management frame determines whether that client station 25 is a member of the group identified by the group number indicated in the group management frame 702, in an embodiment. For example, a client station 25 that receives the group management frame 704 determines that the client station 25 is a member of the group indicated by the management frame 702 by detecting its own AID or partial AID in one of the station identification field included in the management frame 702. In an embodiment, the client station 25 further determines its position within the group based on placement of its AID relative to placement of the other AIDS within the management frame 702.

During a time interval 704, the client stations 25 identified by the group management group 702 transmit respective acknowledgement frame 706 to the AP 14. In an embodiment, the client station 25 identified first in the group management frame 702 transits its acknowledgement frame 706-1 during a time interval that begins upon expiration of a certain predetermined time interval, such as a time interval corresponding to SIFS or another suitable predetermined time interval, after completion of reception of the group management frame 704 by the client station 25. The AP 14 receives the acknowledgement frame 706-1 from the first client station 25 and successively polls for acknowledgement frames from each of the remaining client stations 25 identified by the group management frame 704, in an embodiment. For example, the AP 14 successively transmits respective poll frames 708 to each of the remaining client stations 25 of the group of client stations 25. Each of the remaining client stations 25 transmits its acknowledgement frame 706 during a time interval that begins upon expiration of a certain predetermined time interval, such as a time interval corresponding to SIFS or another suitable time interval, after completion of reception by the client station 25 of the poll frame 708 directed to the client station 25, in an embodiment. After receiving the respective acknowledgement frames 708 from the client stations 25, the AP 14 transmits one or more OFDMA data units to the group of client stations 25, in an embodiment. To indicate to the client stations that an OFDMA data unit is directed to the group of client stations, the AP 14 includes, in the OFDMA data, the group ID provided to the client stations 25 by the group management frame 802, in an embodiment.

Figure 8:
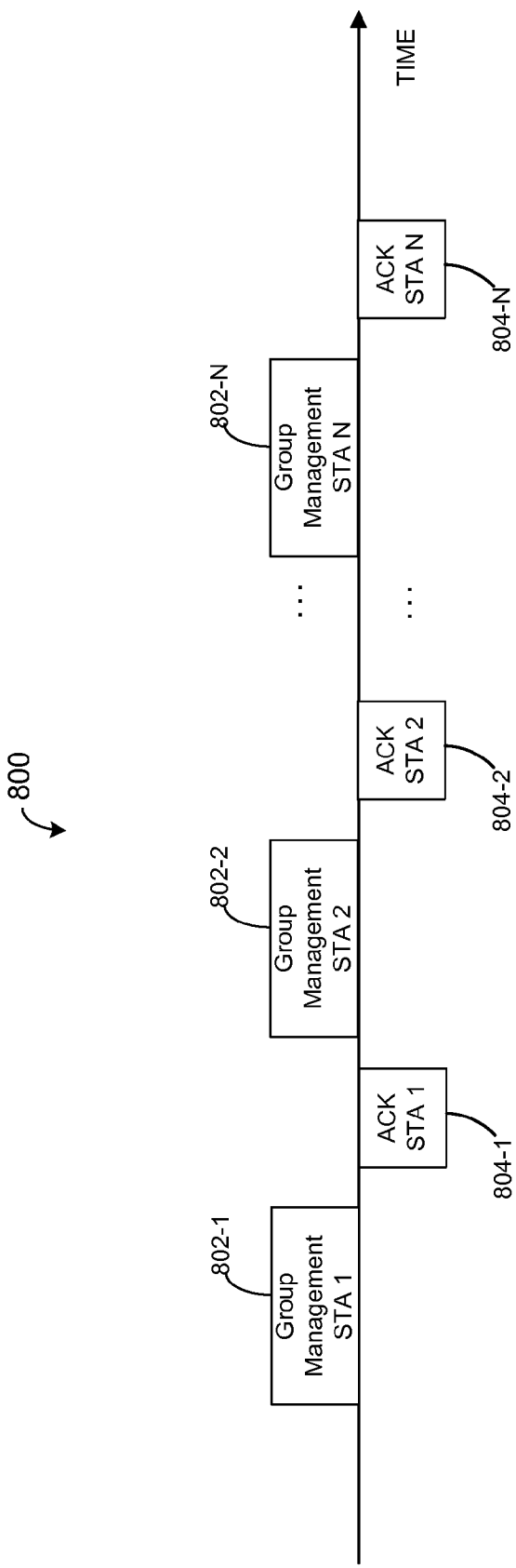
FIG. 8 is a timing diagram illustrating a notification procedure used by an AP to inform a plurality of client stations that the client stations are members of a group of client stations for OFDMA communication, according to another embodiment.

FIG. 8 is a timing diagram illustrating a notification procedure 800 used by the AP 14 to inform a plurality of client stations 25 that the client stations 25 are members of a group of client stations for OFDMA communication, according to another embodiment. The procedure 800 is similar to the procedure 700 of FIG. 7, except that in the notification procedure 800, the AP 14 transits a respective group announcement frame 802 to each client station 25 included in the group. In an embodiment, each management frame 802 is substantially the same as the group management frame 702 of FIG. 7. In an embodiment, a client station 25 that receives the group management frame 802 directed to the group of client stations 25 determines that the client station 25 belongs to the group of client stations 25 based on its own AID in the group management frame 802. In an embodiment, the client station 25 further determines its position within the group based on placement of its AID relative to placement of the other AIDs within the management frame 802. After receiving management frame 802 directed to a client station 25, the client station 25 transmits an acknowledgement frame 804 to the AP 14. In an embodiment, each client station 25 transmits an acknowledgment frame 804 during a time interval that begins upon expiration of a certain predetermined time interval, such as a time interval corresponding to SIFS or another suitable time interval, after completion of reception by the client station 25 of the group management frame 802 directed to the client station 25, in an embodiment. After receiving the respective acknowledgement frames 804 from the client stations 25, the AP 14 transmits one or more OFDMA data units to the group of client stations 25, in an embodiment.

In various embodiments, the AP 14 employs static allocation, semi-static allocation or dynamic allocation to allocate respective sub-channel blocks to client stations 25 in a group for OFDMA communication with the client station 25. In an embodiment in which the AP 14 employs static allocation, the AP 14 allocates respective sub-channel blocks to client stations 25 in a group of client stations 25 for OFDMA communication with the client station 25 when the AP 14 forms the group, of client stations 25, and the sub-channel block allocation to the client stations 25 persists for the life of the group. In an embodiment, the AP 14 indicates to the client stations 25 that belong to a group using a group management frame that notifies the client stations 25 of their membership in the group. For example, the group management frame 702 of FIG. 7 identifies a group of client stations 25, and also includes indications of respective sub-channel blocks allocated to each of the identified client stations 25. Similarly, each group management frame 802 of FIG. 8 includes indications of respective sub-channel blocks allocated to each of the identified client stations 25 identified by the group management frame 802, in an embodiment.

In an embodiment in which the AP 14 employs semi-static sub-channel block allocation, allocation of the sub-channel blocks to client stations 25 in a group can change during the life of the group. For example, the AP 14 periodically obtains, for each of the client stations 25 in a group, one or more quality indicators corresponding to one or more sub-channel blocks of the channel associated with the client stations 25 in the group, and determines a suitable sub-channel block allocation to the client stations of the group each time new quality indicators are obtained for the client stations 25 in the group. For example, the AP 14 utilizes the sounding procedure 400 of FIG. 4A, the sounding procedure 500 of FIG. 5, the sounding procedure 500 of FIG. 6, or another suitable channel sounding procedure to periodically obtain quality indicators corresponding to one or more sub-channel blocks of the channel associated with the client stations 25 in the group, and performs sub-channel block allocation based on quality indicators obtained based on the sounding procedure. In an embodiment, the AP transmits one or more group management frames to the client stations 25 in a group to inform the client stations 25 of new sub-channel blocks allocated to the client stations 25 each time the AP 14 completes a sounding procedure and allocates sub-channel blocks allocated to the client stations 25 based on the sounding procedure.

In an embodiment in which the AP 14 employs dynamic sub-channel block allocation, the AP 14 allocates sub-channel blocks to client station 25 in a group on packet-per-packet basis, for example prior to transmission of each OFDMA data unit to the client stations of the group. In an embodiment in which the AP 14 employs dynamic sub-channel block allocation the AP 14 indicates to the client statins 25 in a group the sub-channel blocks allocated to the client stations 25 for a particular OFDMA transmission to the client stations 25 by including the indications in a preamble of the OFDMA transmission. For example, in an embodiment, the sub-channel block allocation indications are included in a signal field of the OFDMA transmission. With reference to FIG. 3, the sub-channel block allocation indications are included in the HEW-SIGA fields 310, in an example embodiment. In an embodiment, the signal field of the OFDMA transmission includes a group number subfield that identifies a group of client stations 25, and respective sub-channel allocation subfields corresponding to the client stations 25 of the identified group. In an embodiment, the sub-channel allocation subfields in the signal field are provided in the order corresponding to client station position within the group, wherein the client station position corresponds to the client station position determined by each client station 25 based on a group management frame previously received by the client station 25. When receiving an OFDMA transmission directed to a group of client stations 25, each client station 25 that is a member of the group determines, based on the sub-channel allocation subfield corresponding to the client station 25 in the signal field of the OFDMA transmission, which sub-channel block within the OFDM transmission is allocated to the client station 25, in an embodiment.

In some embodiments, client stations 25, rather than AP 14, conduct channel sounding to obtain one or more quality indicators corresponding to one or more sub-channel blocks of the communication channel associated with the client stations 25, and provide indications of one or more preferred sub-channel blocks to the AP 14. In an embodiment, the client stations 25 conduct explicit channel sounding similar to the sounding procedure 400 described above with respect to FIG. 4A, and obtain characteristics of the communication channels between the AP 14 and the client stations 25 based on explicitly sounding the communication channels. For example, a client station 25 initiates a sounding procedure with AP 14 by transmitting a sounding packet the same as or similar to the sounding packet 408 to the AP 14. The AP 14 provides feedback to the client station 25, such as via a feedback packet the same as or similar to one of the feedback packets 412. The client station 25 obtains one or more quality indicators corresponding to one or more sub-channel blocks of the communication channel based on the feedback received from the AP 14, and identifies one or more sub-channel blocks preferred by the client station 25 to be used for OFDMA communication with client station 25. In an embodiment, the client station 25 identifies multiple sub-channel blocks preferred by the client station 25 to be used for OFDMA communication with the client station 25, and ranks the multiple sub-channel blocks in order of preference. The client station 25 then provides indications of the one or more preferred sub-channel blocks, and, if determined, indications of the order of preference of the sub-channel blocks, to the AP 14.

In another embodiment, a client station 25 conducts an implicit channel sounding procedure with the AP 14, similar to the sounding procedure 500 described above with respect to FIG. 5, and obtains quality indications corresponding to one or more sub-channel blocks of the communication channel based on the implicit sounding procedure. For example, the client station 25 transmits a request to the AP 14 requesting training signals to be transmitted by the AP 14. In response to the request, the AP 14 transmits a sounding packet to the client station 25. The client station 25 obtains characteristics of the communication channel based on the received sounding frame, selects one or more preferred sub-channel blocks, and, in some embodiments, ranks selected multiple sub-channel blocks in order of preference. The client station 25 then provides indications of the one or more selected sub-channel blocks and, if determined, rankings corresponding to order of preference of the one or more sub-channel blocks to the AP 14. Similarly, in an embodiment, a client station 25 conducts a transparent implicit sounding procedure, similar to the transparent implicit sounding procedure 600 described above with respect to FIG. 6. For example, the client station 25 obtains characteristics of the channel between the client station 25 and the AP 14 based on one or more regular data units received from the AP 14, selects one or more preferred sub-channel blocks based on the transparent implicit sounding procedure, and provides indications of the one or more preferred sub-channel blocks, and, in some embodiments, indications of the order of preference of the sub-channel blocks, to the AP 14.

The AP 14 obtains respective indications of preferred sub-channel blocks and/or indications of order of preference of the sub-channel blocks, from each of a plurality of client stations 25. Based on the respective indications obtained from the plurality of client stations 25, the AP 14 selects a group of client stations 25 for OFDMA communication and/or allocates respective sub-channel blocks to respective client stations 25 that are members of a group for OFDMA communication, in various embodiments.

Figure 9:
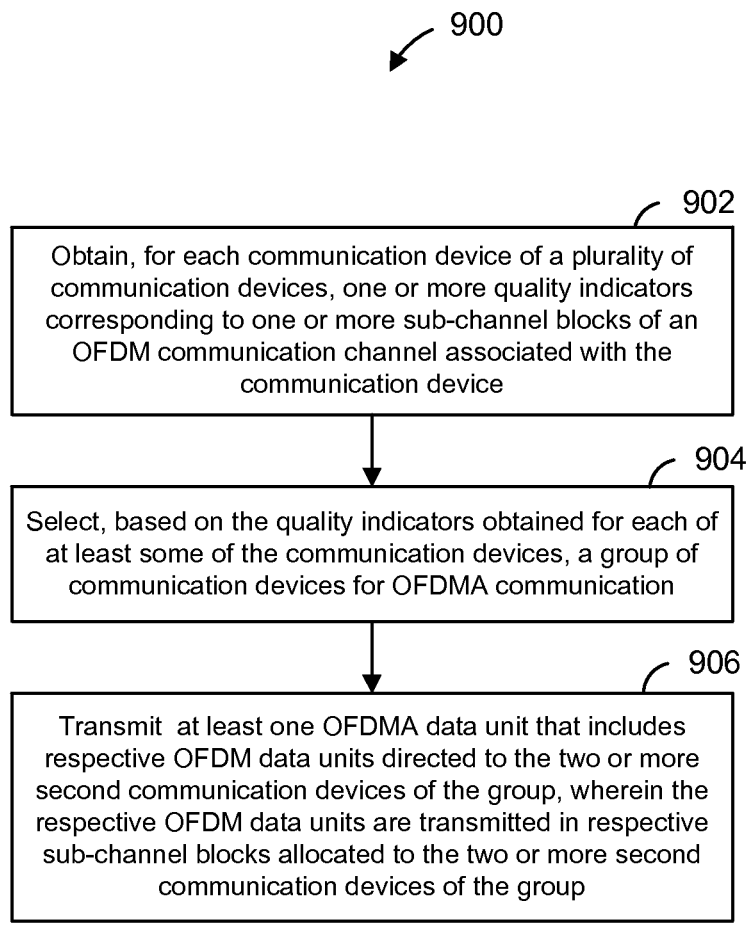
FIG. 9 is a flow diagram of an example method for simultaneously communicating with multiple communication devices in a WLAN, according to an embodiment.

FIG. 9 is a flow diagram of an example method 900 for simultaneously communicating with multiple communication devices in a WLAN, according to an embodiment. In an embodiment, the method 900 is implemented by an AP in the WLAN, according to an embodiment. With reference to FIG. 1, the method 900 is implemented by the AP 14. For example, the method 900 is implemented by the MAC processing unit 18 and/or by the PHY processing unit 20 of the AP 14, in an embodiment. In other embodiments, the method 900 is implemented by other components of the AP 14, or is implemented by a suitable communication device other than the AP 14.

At block 902, one or more quality indicators are obtained for each client station of a plurality of client stations. The one or more quality indicators obtained for a client station correspond to respective one more such channel blocks of an OFDM communication channel associated with the client station. At block 904, a group of client stations for OFDMA communication is selected based on the quality indicators obtained for at least some of the client stations at block 902. At block 906 an OFDMA data unit is transmitted to the group of client stations selected at block 902. Each of the OFDMA data units includes respective OFDM data units transmitted to the client stations of the group. The respective OFDM data units are transmitted to the communication devices in respective sub-channel blocks allocated to the communication devices.

Figure 10:
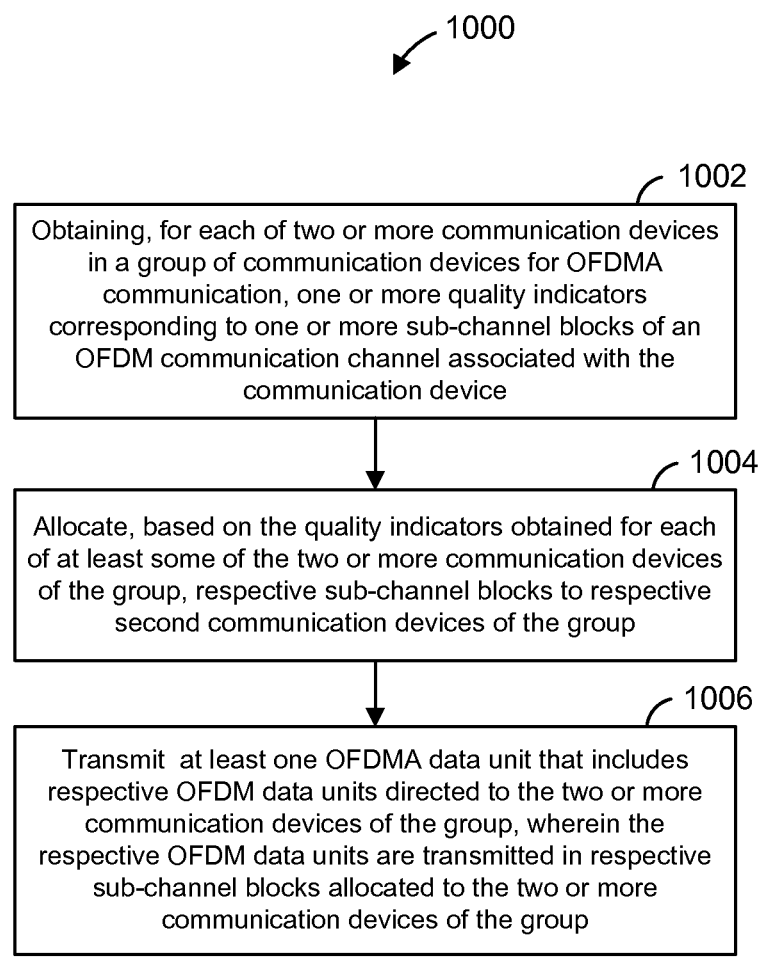
FIG. 10 is a flow diagram of an example method for simultaneously communicating with multiple communication devices in a WLAN, according to another embodiment.

FIG. 10 is a flow diagram of an example method 100 for simultaneously communicating with multiple communication devices in a WLAN, according to an embodiment. In an embodiment, the method 1000 is implemented by an AP in the WLAN, according to an embodiment. With reference to FIG. 1, the method 900 is implemented by the AP 14. For example, the method 1000 is implemented by the MAC processing unit 18 and/or by the PHY processing unit 20 of the AP 14, in an embodiment. In other embodiments, the method 1000 is implemented by other components of the AP 14, or is implemented by a suitable communication device other than the AP 14.

At block 1002, one or more quality indicators are obtained for each client station in a group of client stations for OFDMA communication. The one or more quality indicators obtained for a client station correspond to respective one more such channel blocks of an OFDM communication channel associated with the client station. At block 1004, respective sub-channel blocks are allocated to the two or more client stations of the group. The respective sub-channel blocks are allocated based on the quality indicators obtained at block 1002 for at least some of the two or more client stations of the group. At block 1006, an OFDMA data unit is transmitted to the group of client stations. Each of the OFDMA data units includes respective OFDM data units transmitted to the client stations of the group. The respective OFDM data units are transmitted to the client stations in respective sub-channel blocks allocated to the client stations at block 1004.

In an embodiment, a method for simultaneously communicating with multiple communication devices in a communication network includes obtaining, at a first communication device for each second communication device of a plurality of second communication devices, one or more quality indicators corresponding to one or more sub-channel blocks of an orthogonal frequency division multiplexing (OFDM) communication channel associated with the second communication device. The method also includes selecting, at the first communication device based on the quality indicators obtained for each of at least some of the second communication devices, a group of second communication devices for orthogonal frequency division multiple access (OFDMA) communication, wherein the group includes two or more second communication devices of the plurality of second communication devices. The method additionally includes transmitting, from the first communication device to the group of second communication devices, at least one OFDMA data unit that includes respective OFDM data units directed to the two or more second communication devices of the group, wherein the respective OFDM data units are transmitted in respective sub-channel blocks allocated to the two or more second communication devices of the group.

In other embodiments, the method includes any suitable combination of one or more of the following features.

Obtaining, at the first communication device for each second communication device of the plurality of second communication devices, one or more quality indicators corresponding to one or more sub-channel blocks of OFDM communication channel associated with the second communication device comprises transmitting a sounding packet from the first communication device to the plurality of second communication devices, receiving, at the first communication device, a plurality of respective feedback packets from the plurality of second communication devices, wherein the feedback packets include feedback generated based on the sounding packet, and obtaining the one or more quality indicators for each second communication device based on the feedback packet received from the second communication device.

Obtaining, at the first communication device for each second communication device of the plurality of second communication devices, one or more quality indicators corresponding to one or more sub-channel blocks of the OFDM communication channel associated with the second communication device comprises transmitting a request frame from the first communication device to the plurality of second communication devices, wherein the request frame requests the second communication devices to transmit respective sounding frames to the first communication device, receiving, at the first communication device, respective sounding packets transmitted by the second communication devices in response to the requests frame, and obtaining the one or more quality indicators for each second communication device based on the sounding packet received from the second communication device.

Obtaining, at the first communication device for each second communication device of the plurality of second communication devices, one or more quality indicators corresponding to one or more sub-channel blocks of the OFDM communication channel associated with the second communication device comprises receiving, at the first communication device, respective non-sounding data units transmitted by the second communication devices for purposes other than sounding the OFDM communication channels associated with the second communication devices, and obtaining the one or more quality indicators for each second communication device based on the non-sounding packet received from the second communication device.

Obtaining, at the first communication device for each second communication device of the plurality of second communication devices, one or more quality indicators corresponding to one or more sub-channel blocks of the OFDM communication channel associated with the second communication device comprises obtaining, for each second communication device one or both of (i) indications of one or more preferred sub-channel blocks for the second communication device and (ii) indications of order of preference of multiple preferred sub-channel blocks for the second communication device.

The method further includes, prior to transmitting the at least one OFDMA data unit to the group of second communication devices, transmitting a group management frame to indicate to the second communication devices of the group that the second communication devices are members of the group.

The method further includes allocating, based on the quality indicators obtained for the two or more second communication devices of the group, the respective sub-channel blocks to the two or more second communication devices of the group.

The method further includes after transmitting the at least one OFDMA data unit to the group of second communication devices, obtaining, for each of the second communication devices of the group, one or more new quality indicators corresponding to one or more sub-channel blocks of the OFDM communication channel associated with the second communication device, allocating respective sub-channel blocks to the second communication devices of the group based on the new quality indicators, and transmitting at least one additional OFDMA data unit that includes respective OFDM data units directed to the two or more second communication devices of the group, wherein the respective OFDM data units are transmitted in respective sub-channel blocks allocated to the two or more second communication devices based on the new quality indicators.

In another embodiment, an apparatus for use in a communication system comprises a network interface configured to obtain, for each of a plurality of communication devices, one or more quality indicators corresponding to one or more sub-channel blocks of an orthogonal frequency division multiplexing (OFDM) communication channel associated with the communication device. The network interface is further configured to select, based on the quality indicators obtained for each of at least some communication devices of the plurality of communication devices, a group of communication devices for orthogonal frequency division multiple access (OFDMA) communication, wherein the group includes two or more communication devices of the plurality of communication devices. The network interface is additionally configured to transmit, to the group of communication devices, at least one OFDMA data unit that includes respective OFDM data units directed to the two or more communication devices of the group, wherein the respective OFDM data units are transmitted in respective sub-channel blocks allocated to the two or more communication devices of the group.

In other embodiments, the apparatus further includes any suitable combination of one or more of the following features.

The network interface is configured to transmit a sounding packet from the first communication device to the plurality of communication devices, receive a plurality of respective feedback packets from the plurality of communication devices, wherein the feedback packets include feedback generated based on the sounding packet, and obtain the one or more quality indicators for each communication device based on the feedback packet received from the communication device.

The network interface is configured to transmit a request frame from the first communication device to the plurality of communication devices, wherein the request frame requests the communication devices to transmit respective sounding frames, receive respective sounding packets transmitted by the communication devices in response to the request frame, and obtain the one or more quality indicators for each communication device based on the sounding packet received from the communication device.

The network interface is configured to receive respective non-sounding data units transmitted by the communication devices for purposes other than sounding the OFDM communication channels associated with the communication devices, and obtain the one or more quality indicators for each communication device based on the non-sounding packet received from the communication device.

The network interface is configured to obtain the one or more quality indicators for each communication device by obtaining one or both of (i) indications of one or more preferred sub-channel blocks for the communication device and (ii) indications of order of preference of multiple preferred sub-channel blocks for the communication device.

The network interface is further configured to, prior to transmitting the at least one OFDMA data unit to the group of communication devices, transmit a group management frame to indicate to the communication devices of the group that the communication devices are members of the group.

The network interface is further configured to allocate, based on the quality indicators obtained for the two or more communication devices of the group, the respective sub-channel blocks to the two or more communication devices of the group.

The network interface is further configured to after transmitting the at least one OFDMA data unit to the group of communication devices, obtain, for each of the communication devices of the group, one or more new quality indicators corresponding to one or more sub-channel blocks of the OFDM communication channel associated with the communication device, allocate respective sub-channel blocks to the communication devices of the group based on the new quality indicators, and transmit at least one additional OFDMA data unit that includes respective OFDM data units directed to the two or more communication devices of the group, wherein the respective OFDM data units are transmitted in respective sub-channel blocks allocated to the two or more communication devices based on the new quality indicators.

In yet another embodiment, a method for simultaneously communicating with multiple communication devices in a communication network includes obtaining, at a first communication device for each of two or more second communication devices in a group of second communication devices for orthogonal frequency division multiple access (OFDMA) communication, one or more quality indicators corresponding to one or more sub-channel blocks of an orthogonal frequency division multiplexing (OFDM) communication channel associated with the second communication device. The method also includes allocating, based on the quality indicators obtained for each of at least some of the two or more second communication devices of the group, respective sub-channel blocks to respective second communication devices of the group. The method additionally includes transmitting at least one orthogonal frequency division multiple access (OFDMA) data unit that includes respective OFDM data units directed to the two or more communication devices of the group, wherein the respective OFDM data units are transmitted in respective sub-channel blocks allocated to the two or more communication devices of group.

In other embodiments, the method includes any suitable combination of one or more of the following features.

Obtaining, at the first communication device for each of two or more second communication devices in a group of second communication devices for OFDMA communication, one or more quality indicators corresponding to one or more sub-channel blocks of the OFDM communication channel associated with the second communication device comprises transmitting a sounding packet from the first communication device to the two or more second communication devices, receiving, at the first communication device, a plurality of respective feedback packets from the two or more second communication devices, wherein the feedback packets include feedback generated based on the sounding packet, and obtaining the one or more quality indicators for each second communication device based on the feedback packet received from the second communication device.

Obtaining, at the first communication device for each of two or more second communication devices in a group of second communication devices for OFDMA communication, one or more quality indicators corresponding to one or more sub-channel blocks of the OFDM communication channel associated with the second communication device comprises transmitting a request frame from the first communication device to the two or more second communication devices, wherein the request frame requests the second communication devices to transmit respective sounding frames to the first communication device, receiving, at the first communication device, respective sounding packets transmitted by the two or more second communication devices in response to the requests frame, and obtaining the one or more quality indicators for each second communication device based on the sounding packet received from the second communication device.

Obtaining, at the first communication device for each of two or more second communication devices in a group of second communication devices for OFDMA communication, one or more quality indicators corresponding to one or more sub-channel blocks of the OFDM communication channel associated with the second communication device comprises receiving, at the first communication device, respective non-sounding data units transmitted by the two or more second communication devices for purposes other than sounding the OFDM communication channels associated with the second communication devices, and obtaining the one or more quality indicators for each second communication device based on the non-sounding packet received from the second communication device.

Obtaining, at the first communication device for each of two or more second communication devices in a group of second communication devices for OFDMA communication, one or more quality indicators corresponding to one or more sub-channel blocks of the OFDM communication channel associated with the second communication device comprises obtaining, for each second communication device one or both of (i) indications of one or more preferred sub-channel blocks for the second communication device and (ii) indications of order of preference of multiple preferred sub-channel blocks for the second communication device.

The method further includes after transmitting the at least one OFDMA data unit to the group of second communication devices, obtaining, for each of the second communication devices of the group, one or more new quality indicators corresponding to one or more sub-channel blocks of the OFDM communication channel associated with the second communication device, allocating respective sub-channel blocks to the second communication devices of the group based on the new quality indicators, and transmitting at least one additional OFDMA data unit that includes respective OFDM data units directed to the two or more second communication devices of the group, wherein the respective OFDM data units are transmitted in respective sub-channel blocks allocated to the two or more second communication devices based on the new quality indicators.

In still another embodiment, an apparatus for use in a communication system comprises a network interface configured to obtain, for each of two or more communication devices in a group of communication devices for orthogonal frequency division multiple access (OFDMA) communication, one or more quality indicators corresponding to one or more sub-channel blocks of an orthogonal frequency division multiplexing (OFDM) communication channel associated with the communication device. The network interface is additionally configured to allocate, based on the quality indicators obtained for each of at least some of the two or more communication devices of the two or more communication devices, respective sub-channel blocks to respective communication devices of the group. The network interface is further configured to transmit at least one orthogonal frequency division multiple access (OFDMA) data unit that includes respective OFDM data units directed to the two or more communication devices of the group, wherein the respective OFDM data units are transmitted in respective sub-channel blocks allocated to the two or more communication devices of group.

In other embodiments, the apparatus further includes any suitable combination of one or more of the following features.

The network interface is configured to transmit a sounding packet to the two or more communication devices, receive a plurality of respective feedback packets from the two or more communication devices, wherein the feedback packets include feedback generated based on the sounding packet, and obtain the one or more quality indicators for each communication device based on the feedback packet received from the communication device.

The network interface is configured to transmit a request frame to the two or more communication devices, wherein the request frame requests the communication devices to transmit respective sounding frames, receive respective sounding packets transmitted by the two or more communication devices in response to the requests frame, and obtain the one or more quality indicators for each communication device based on the sounding packet received from the communication device.

The network interface is configured to receive respective non-sounding data units transmitted by the two or more communication devices for purposes other than sounding the OFDM communication channels associated with the communication devices, and obtain the one or more quality indicators for each communication device based on the non-sounding packet received from the communication device.

The network interface is configured to obtain the one or more quality indicators for each communication device by obtaining one or both of (i) indications of one or more preferred sub-channel blocks for the communication device and (ii) indications of order of preference of multiple preferred sub-channel blocks for the communication device.

The network interface is further configured to after transmitting the at least one OFDMA data unit to the group of communication devices, obtain, for each of the communication devices of the group, one or more new quality indicators corresponding to one or more sub-channel blocks of the OFDM communication channel associated with the communication device, allocate respective sub-channel blocks to the communication devices of the group based on the new quality indicators, and transmit at least one additional OFDMA data unit that includes respective OFDM data units directed to the two or more communication devices of the group, wherein the respective OFDM data units are transmitted in respective sub-channel blocks allocated to the two or more communication devices based on the new quality indicators.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for simultaneously communicating with multiple communication devices in a communication network, the method comprising:
    receiving, at a first communication device, sounding feedback packets from a plurality of second communication devices, wherein each sounding feedback packet includes (i) beamforming feedback to be used by the first communication device for beamforming to the corresponding second communication device and (ii) one or more quality indicators corresponding to one or more sub-channel blocks of an orthogonal frequency division multiplexing (OFDM) communication channel associated with the corresponding second communication device;
    selecting, at the first communication device based on the one or more quality indicators received from each of at least some of the second communication devices, a group of second communication devices for orthogonal frequency division multiple access (OFDMA) communication, wherein the group includes two or more second communication devices of the plurality of second communication devices; and
    transmitting, from the first communication device to the group of second communication devices, at least one OFDMA data unit that includes respective OFDM data units directed to the two or more second communication devices of the group, wherein the respective OFDM data units are transmitted in respective sub-channel blocks allocated to the two or more second communication devices of the group.

2. The method of claim 1, further comprising prior to receiving the sounding feedback packets, transmitting a sounding packet from the first communication device to the plurality of second communication devices, wherein the sounding feedback packets are transmitted by the plurality of second communication devices in response to receiving the sounding packet.

3. The method of claim 1, wherein the one or more quality indicators corresponding to one or more sub-channel blocks of the OFDM communication channel associated with the second communication device include one or both of (i) indications of one or more preferred sub-channel blocks for the second communication device and (ii) indications of order of preference of multiple preferred sub-channel blocks for the second communication device.

4. The method of claim 1, further comprising, prior to transmitting the at least one OFDMA data unit to the group of second communication devices, transmitting a group management frame to indicate to the second communication devices of the group that the second communication devices are members of the group.

5. The method of claim 1, further comprising allocating, based on the quality indicators obtained for the two or more second communication devices of the group, the respective sub-channel blocks to the two or more second communication devices of the group.

6. The method of claim of claim 5, further comprising:
    after transmitting the at least one OFDMA data unit to the group of second communication devices, obtaining, for each of the second communication devices of the group, one or more new quality indicators corresponding to one or more sub-channel blocks of the OFDM communication channel associated with the second communication device,
    allocating respective sub-channel blocks to the second communication devices of the group based on the new quality indicators, and
    transmitting at least one additional OFDMA data unit that includes respective OFDM data units directed to the two or more second communication devices of the group, wherein the respective OFDM data units are transmitted in respective sub-channel blocks allocated to the two or more second communication devices based on the new quality indicators.

7. An apparatus for use in a communication system, the apparatus comprising:
    a network interface comprising one or more integrated circuits configured to
        receive sounding feedback packets from a plurality of communication devices, wherein each sounding feedback packet includes (i) beamforming feedback to be used for beamforming to the corresponding communication device and (ii) one or more quality indicators corresponding to one or more sub-channel blocks of an orthogonal frequency division multiplexing (OFDM) communication channel associated with the corresponding communication device;
        select, based on the one or more quality indicators received from each of at least some communication devices of the plurality of communication devices, a group of communication devices for orthogonal frequency division multiple access (OFDMA) communication, wherein the group includes two or more communication devices of the plurality of communication devices; and
        transmit, to the group of communication devices, at least one OFDMA data unit that includes respective OFDM data units directed to the two or more communication devices of the group, wherein the respective OFDM data units are transmitted in respective sub-channel blocks allocated to the two or more communication devices of the group.

8. The apparatus of claim 7, wherein the one or more integrated circuits are further configured to:
    prior to receiving the sounding feedback packets, transmit a sounding packet to the plurality of communication devices, wherein the sounding feedback packets are transmitted by the plurality of communication devices in response to receiving the sounding packet.

9. The apparatus of claim 7, wherein the one or more quality indicators corresponding to one or more sub-channel blocks of the OFDM communication channel associated with the communication device include one or both of (i) indications of one or more preferred sub-channel blocks for the communication device and (ii) indications of order of preference of multiple preferred sub-channel blocks for the communication device.

10. The apparatus of claim 7, wherein the one or more integrated circuits are further configured to, prior to transmitting the at least one OFDMA data unit to the group of communication devices, transmit a group management frame to indicate to the communication devices of the group that the communication devices are members of the group.

11. The apparatus of claim 7, wherein the one or more integrated circuits are further configured to allocate, based on the quality indicators obtained for the two or more communication devices of the group, the respective sub-channel blocks to the two or more communication devices of the group.

12. The apparatus of claim 11, wherein the one or more integrated circuits are further configured to:

after transmitting the at least one OFDMA data unit to the group of communication devices, obtain, for each of the communication devices of the group, one or more new quality indicators corresponding to one or more sub-channel blocks of the OFDM communication channel associated with the communication device, allocate respective sub-channel blocks to the communication devices of the group based on the new quality indicators, and transmit at least one additional OFDMA data unit that includes respective OFDM data units directed to the two or more communication devices of the group, wherein the respective OFDM data units are transmitted in respective sub-channel blocks allocated to the two or more communication devices based on the new quality indicators.

* * * * *